(12) United States Patent
Toniolo et al.

(10) Patent No.: US 12,407,040 B2
(45) Date of Patent: Sep. 2, 2025

(54) STACKABLE MODULAR BATTERY ENERGY STORAGE SYSTEM

(71) Applicant: Schlumberger Technology Corporation, Sugar Land, TX (US)

(72) Inventors: Julien Toniolo, Houston, TX (US); Lijun Song, Sugar Land, TX (US); Zhixiong Liu, Singapore (SG); Nicolas Barthelemy, Shanghai (CN)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/490,872

(22) Filed: Oct. 20, 2023

(65) Prior Publication Data

US 2024/0297367 A1    Sep. 5, 2024

Related U.S. Application Data

(60) Provisional application No. 63/488,182, filed on Mar. 3, 2023.

(51) Int. Cl.
  *H01M 10/6565*    (2014.01)
  *H01M 10/48*      (2006.01)
  (Continued)

(52) U.S. Cl.
  CPC ..... *H01M 10/6565* (2015.04); *H01M 10/486* (2013.01); *H01M 10/613* (2015.04);
  (Continued)

(58) Field of Classification Search
  CPC ........... H01M 10/6565; H01M 10/613; H01M 10/635; H01M 10/6556; H01M 50/271; H01M 10/486
  See application file for complete search history.

(56) References Cited

U.S. PATENT DOCUMENTS

| | | | |
|---|---|---|---|
| 2006/0036883 A1* | 2/2006 | Hashizumi | B60L 58/26 713/300 |
| 2012/0032638 A1* | 2/2012 | Jung | B60L 58/27 320/112 |

(Continued)

FOREIGN PATENT DOCUMENTS

| | | |
|---|---|---|
| CN | 101409374 A | 4/2009 |
| CN | 110994060 A | 4/2020 |

OTHER PUBLICATIONS

Search Report of European Patent Application No. EP23204987.4 dated on Apr. 15, 2024; 8 Pages.

*Primary Examiner* — James Lee

(74) *Attorney, Agent, or Firm* — Jeffrey D. Frantz

(57) ABSTRACT

Aspects of the disclosure provide a stackable and modular battery energy storage system. An example energy storage system may include a plurality of stacked containers, each of the plurality of containers includes a housing having an upper face and a lower face; the lower face of a second container is disposed on the upper face of a first container; at least the second container includes a battery pack within the housing; at least one electrical interface situated on the lower face of the second container is connected to at least one electrical interface situated on the upper face of the first container; and at least one flow interface situated on the lower face of the second container is connected to at least one flow interfaces situated on the upper face of the first container.

13 Claims, 20 Drawing Sheets

(51) Int. Cl.
*H01M 10/613* (2014.01)
*H01M 10/635* (2014.01)
*H01M 10/6556* (2014.01)
*H01M 50/271* (2021.01)

(52) U.S. Cl.
CPC ..... *H01M 10/635* (2015.04); *H01M 10/6556* (2015.04); *H01M 50/271* (2021.01)

(56) References Cited

U.S. PATENT DOCUMENTS

| | | | | |
|---|---|---|---|---|
| 2014/0087221 | A1* | 3/2014 | Kim | H01M 50/211 |
| | | | | 429/158 |
| 2019/0097280 | A1* | 3/2019 | You | H01M 10/627 |
| 2023/0109536 | A1* | 4/2023 | Smith | H02J 50/10 |
| | | | | 105/50 |

* cited by examiner

STACKABLE MODULAR BATTERY ENERGY STORAGE SYSTEM

CROSS-REFERENCE TO RELATED APPLICATION & PRIORITY CLAIM

This application claims benefit of and priority to U.S. Provisional Application No. 63/488,182, filed Mar. 3, 2023, which is herein incorporated by reference in its entirety for all applicable purposes.

BACKGROUND

Field of the Disclosure

The disclosure relates to battery energy storage systems (BESSs).

Description of Related Art

Energy storage is important to decarbonizing the power system and reducing greenhouse gas emissions. Energy storage is also essential to the building of resilient, reliable, and affordable electricity grids that can handle the variable nature of renewable energy sources (also referred to herein as, "renewables"). For example, the availability of wind and solar energy is variable due to the intermittent presence or absence of wind or sunlight at different times. Due to the intermittence of renewable energy sources as well as local, transient grid capability challenges, there is a need to store electrical energy.

A BESS may include rechargeable batteries that can store energy from different sources for later use. Rechargeable batteries are systems that are able to store and release energy. Battery are generally electrochemical batteries, such as lithium-ion, nickel-hydrogen, metal-air, etc. but the disclosure is not limited to electrochemical batteries and could be used to package another type of batteries. A BESS can be used to balance the electric grid, provide backup power, and improve grid stability. In some uses, BESSs enable energy from renewables, like solar and wind, to be stored and then for the energy to be discharged when needed. A BESS may be used to smooth out fluctuations in power demand and supply, to regulate voltage and frequency, and to provide backup power in case of a power outage ensuring that essential services such as hospitals, emergency services, and communication networks remain operational. The use of BESSs can help to reduce the need for fossil-fuel-based power plants and to increase the integration of renewable energy sources into the grid. In recent years, advances in electrochemical battery technology makes BESSs a viable solution for large capacity energy storage, such as the energy storage for commercial applications, industrial applications, or other large grid level applications.

The physical implementation of a BESS often involves grouping these systems together in a limited space, typically outdoors on a concrete pad. However, energy density, cost per unit of energy stored, environmental conditions, system durability, or the need for cooling in operation constrain the systems.

There exists a need for further improvements in battery energy storage systems to overcome, at least, the aforementioned technical challenges.

SUMMARY

The disclosure provides a stackable and modular battery energy storage system.

Some embodiments provide an energy storage system. The energy storage system includes a plurality of stacked containers including a first container and a second container. Each of the plurality of containers includes a housing having an upper face and a lower face. The lower face of the second container is disposed on the upper face of the first container, the first container and the second container forming a stack. At least the first container or the second container includes a battery pack within the housing. Each of the plurality of containers includes one or more flow interfaces and one or more electrical interfaces. At least one electrical interface, of the one or more electrical interfaces of the second container, situated on the lower face of the second container is connected to at least one electrical interface, of the one or more electrical interfaces of the first container, situated on the upper face of the first container. At least one flow interface, of the one or more flow interfaces of the second container, situated on the lower face of the second container is connected to at least one flow interfaces, of the one or more flow interfaces, situated on the upper face of the first container.

Some embodiments provide another energy storage system. The energy storage system includes a cooling module. The energy storage system includes a battery module. The battery module includes a housing and at least one battery pack within the housing. The battery module is connected via a first flow path to the cooling module and a second flow path to the external environment. The cooling module is configured to cool the battery module via the first flow path. The energy storage system includes an opening and closing element configured to open and close the second flow path. The energy storage system includes a temperature sensor configured to sense ambient temperature outside the energy storage system. The energy storage system includes a controller configured to control the cooling module and the opening and closing element based on the sensed ambient temperature.

Some embodiments relate to a method of cooling a stacked battery energy storage system, comprising sensing, with a temperature sensor, ambient temperature outside the stacked battery energy storage system; and controlling, via a controller, a cooling module and an opening and closing element based on the sensed ambient temperature. The controlling includes activating or deactivating the cooling module; and opening or closing the opening and closing element to open or close a first flow path between the cooling module and one or more battery packs located in one or more of the plurality of stacked containers; and opening or closing the opening and closing element to open or close a second flow path between the one or more battery packs located in the one or more containers and an external environment.

The following description and the appended figures set forth certain features for purposes of illustration.

BRIEF DESCRIPTION OF DRAWINGS

The figures show several embodiments of the system according to the disclosure.

DETAILED DESCRIPTION

Figure 1A:
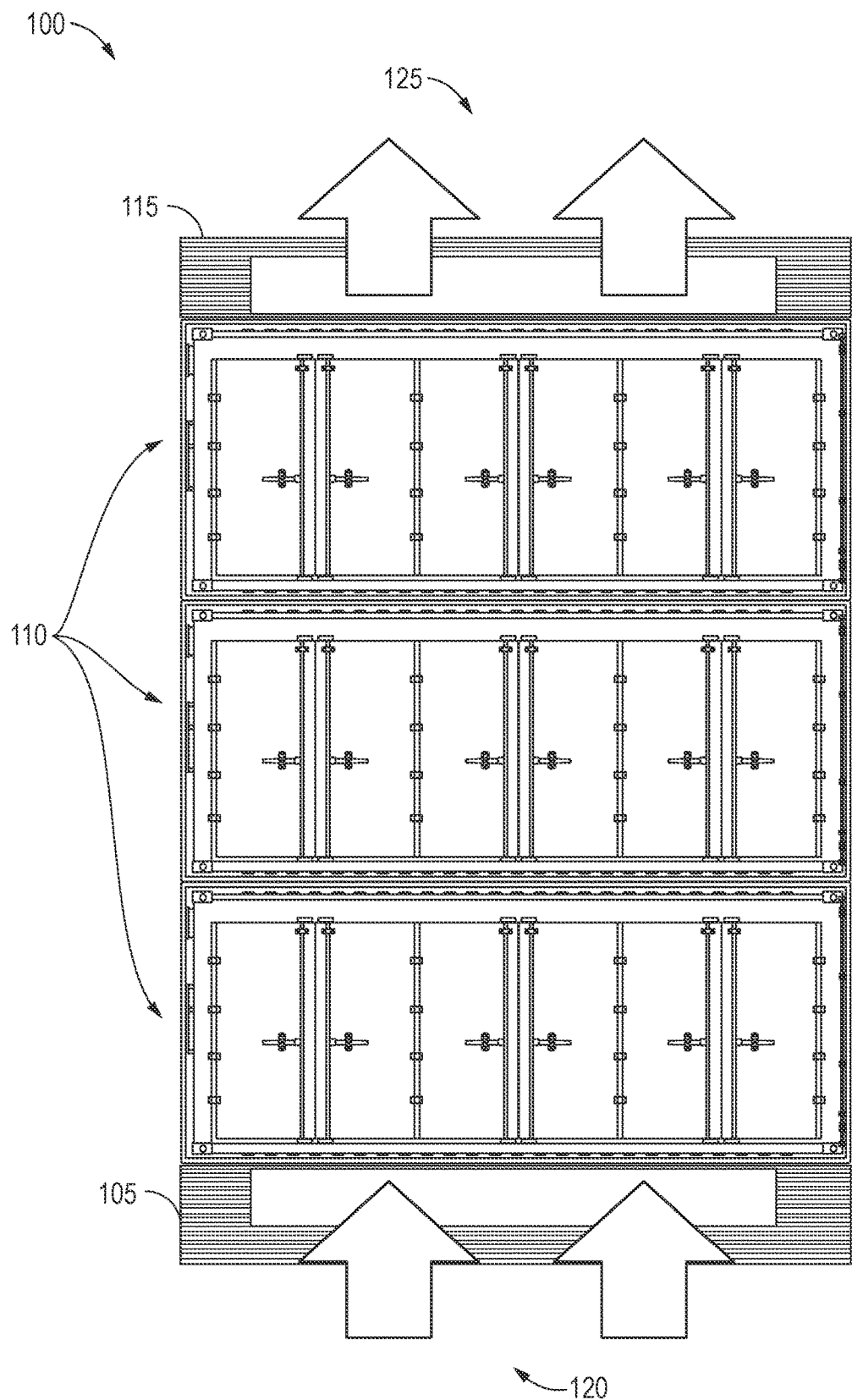
FIG. 1A depicts a front view of an example stackable and modular forced-air BESS.

The disclosure provides a stackable and modular BESS.

In some embodiments, the disclosure provides a combinable set of stackable building blocks to build battery energy storage systems in the megawatt hour (MWh) to gigawatt hour (GWh) range. In one embodiment, the batteries may be nickel-hydrogen batteries but the disclosure applies to any type of electrochemical battery including lithium-ion batteries, magnesium-ion batteries, metal-air batteries, nickel-zinc batteries, or other types of rechargeable electrochemical batteries. The combinable set of stackable building blocks can be arranged in various configurations to provide a modular battery energy storage system.

The stackable building blocks of the modular battery energy storage system may use standard containers (such as international organization for standardization (ISO) shipping containers). The building blocks may have electrical and flow interfaces at the lower face (i.e., the floor) and the upper face (i.e., the top). The electrical and flow interfaces may provide for electrical flow and vertical air flow between the building blocks that are stacked on one another.

The modular battery energy storage system includes at least battery blocks. In addition, the modular battery energy storage system may include other modules such as a standoff module or a cap module (e.g., a cap module). The battery blocks, standoff module, and cap module may be stacked. The modular battery energy storage system may include a cluster, or multiple clusters, of several stacks. The modular battery energy storage system may include one or more module that are not part of a stack, such as one or more cooling modules, inverter modules, and/or transformer modules. In some examples, multiple stacks may share a cooling module, inverter module, and/or transformer module.

In some embodiments, the modular battery energy storage system includes at least a battery module and a cooling module. The battery module is connected via a first flow path to the cooling module and a second flow path to the external environment. The modular BESS includes an opening and closing element for opening and closing the second flow path, a temperature sensor for sensing a temperature of the outside environment, and a controller for controlling the cooling module and opening and closing element in response to readings from the temperature sensor. In some embodiments, a battery pack contained in a building block may include an air deflector to guide the air to each cell for cooling. In some embodiments, partial cooling is performed. For example, a cooling air flow path may bypass one or more lower building blocks and directly go to cool cells in a higher battery block in a stack.

The modular battery energy storage system may operate according to a first mode where cooling of the battery module(s) relies on the outside environment (e.g., forced-air) and/or a second mode where a cooling module is activated (active cooling) and the system forms a closed loop.

FIG. 1A-FIG. 6 illustrate example forced-air battery energy storage system configurations.

Figure 1B:
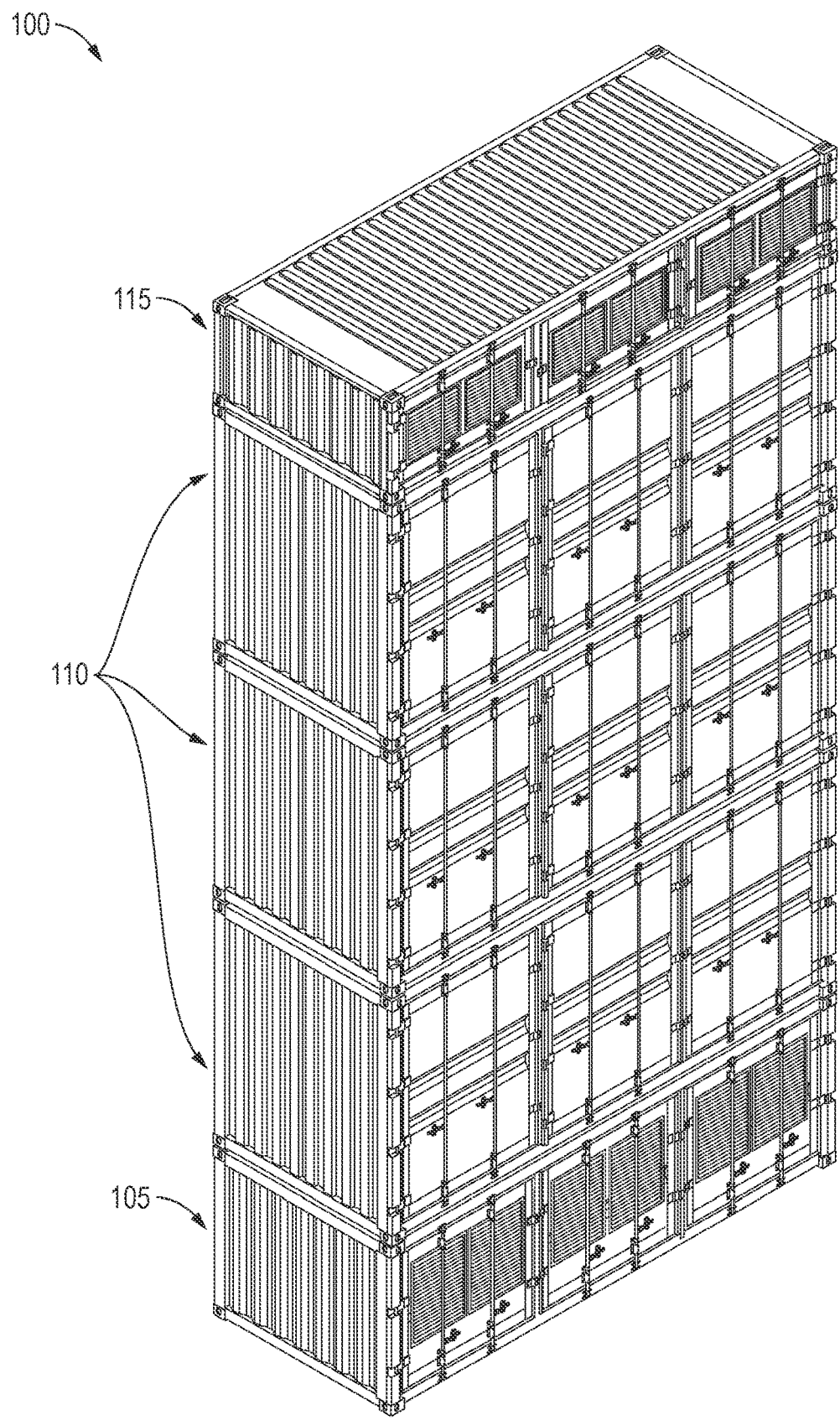
FIG. 1B depicts a top and side view of the example stackable and modular forced-air BESS.

FIG. 1A depicts a front view of an example stackable and modular forced-air BESS 100 and FIG. 1B depicts a top and side view of the example stackable and modular forced-air BESS 100. In the example illustrated in FIG. 1A and FIG. 1B, the modular battery energy storage system includes five stacked blocks (e.g., building block modules): a standoff block 105, three battery blocks 110 containing elements of the energy storage, and a cap block 115. The stacked building blocks are stacked vertically, from bottom to top, with the standoff block 105, a first battery block 110 (i.e., containing one or more battery packs, also designated a battery DC block), a second battery block 110, a third battery block 110, and the cap block 115.

In some aspects, the battery blocks 110 are connected in series.

In some aspects, each of the building blocks in the modular forced-air BESS 100 are connected to the adjacent building blocks stacked above and below the respective building block. For example, the building blocks may be connected by twist locks (e.g., by twist locks on both sides of the building block), or other type of locking mechanism.

In some aspects, the building blocks in the modular forced-air BESS 100 include electrical and/or air flow lines or other interfaces between each adjacent building block in the stack, as discussed in more detail below with respect to FIGS. 2A-4B. In some embodiments, the building blocks may each include a plurality of flow interfaces and/or electrical interfaces at different locations on the upper and/or lower faces of the container. The interfaces may be situated at a common location on the different building blocks to enable connection with other stacked building blocks.

In some embodiments, the building blocks include flow interfaces at the lower (floor) and upper (ceiling) sides of each building block, allowing cool air 120 to enter and flow vertically from the bottom stack and warm air 125 to exit from the top of the stack.

In some embodiments, the building blocks include electrical interfaces at the upper and lower faces of each building block. Electrical connections (e.g., power connections such as DC high voltage connections, or communication connections such as communication buses) may be connected through the electrical interfaces at the lower and upper faces of the building blocks. The electrical interface may include a sealing element to prevent exchange of electricity between interior and exterior of the building block.

While the example modular BESS illustrated in FIG. 1A and FIG. 1B, includes five stacked building blocks, the modular BESS may include any number of blocks, fewer or greater than five, with at least one battery block 110.

Figure 5:
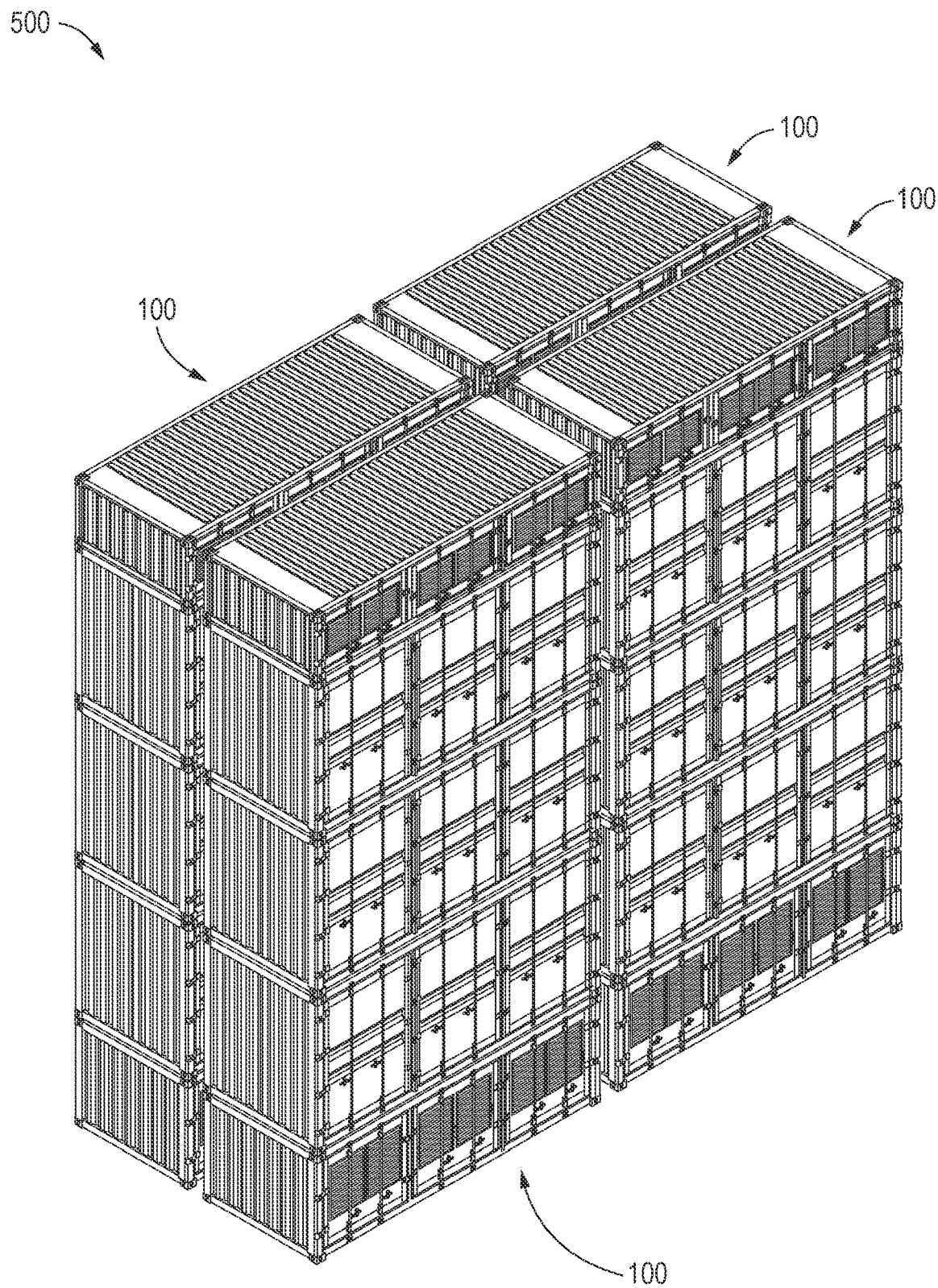
FIG. 5 depicts a top and side view of a configuration of a cluster of four example stackable and modular forced-air BESSs.
Figure 6:
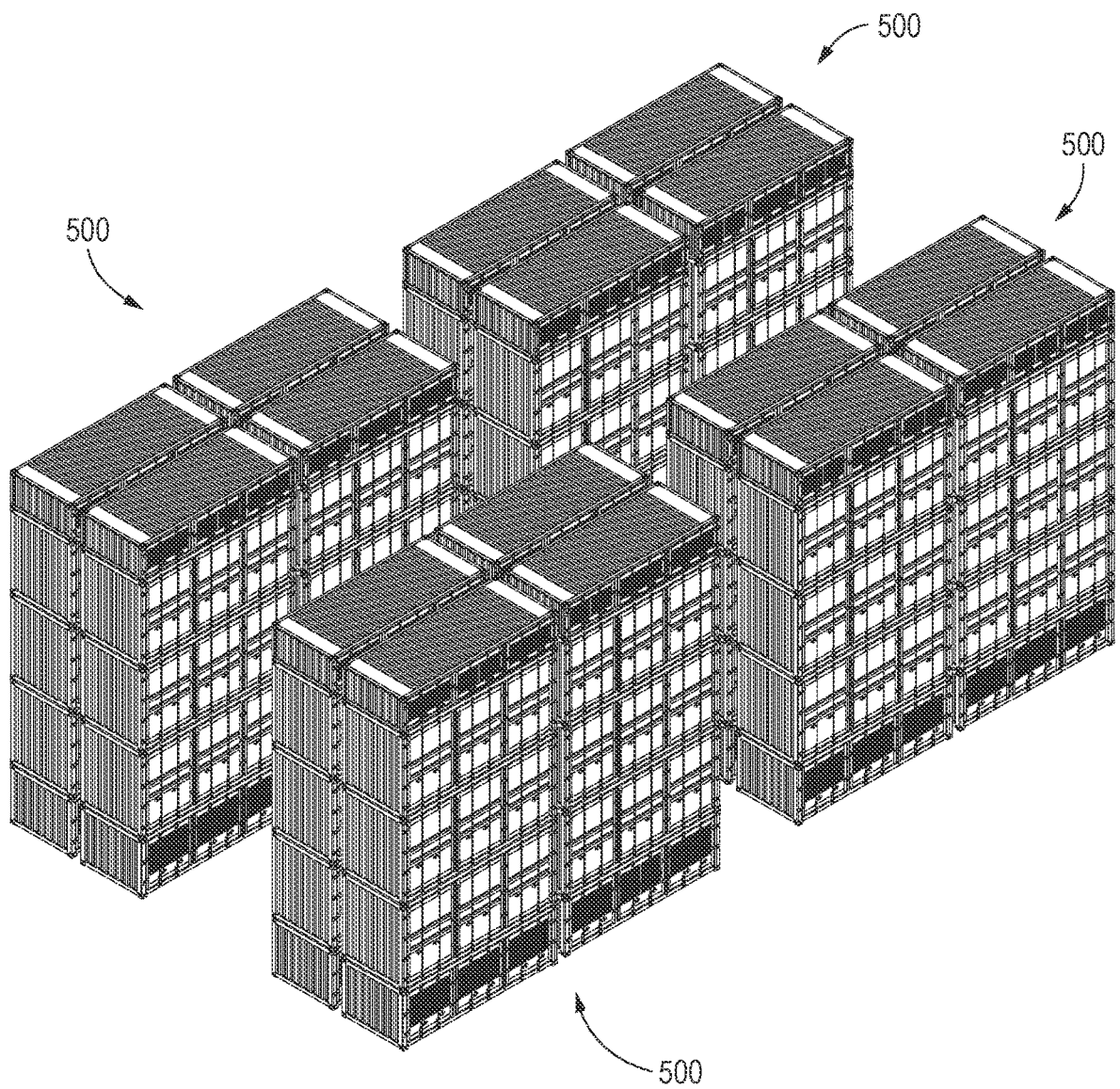
FIG. 6 depicts a top and side view of a configuration of four clusters of example stackable and modular forced-air BESSs.

The example modular forced-air BESS 100 illustrates building blocks stacked in the vertical direction, however, the modular BESS may, additionally or alternatively, include a plurality of vertical stacks arranged side-by-side or in the vicinity of one another as illustrated in FIG. 5 and FIG. 6 discussed in more detail below. Each stack of such a system may be of different height (e.g., different number of building blocks), composition (e.g., different types of building blocks), etc.

Figure 2A:
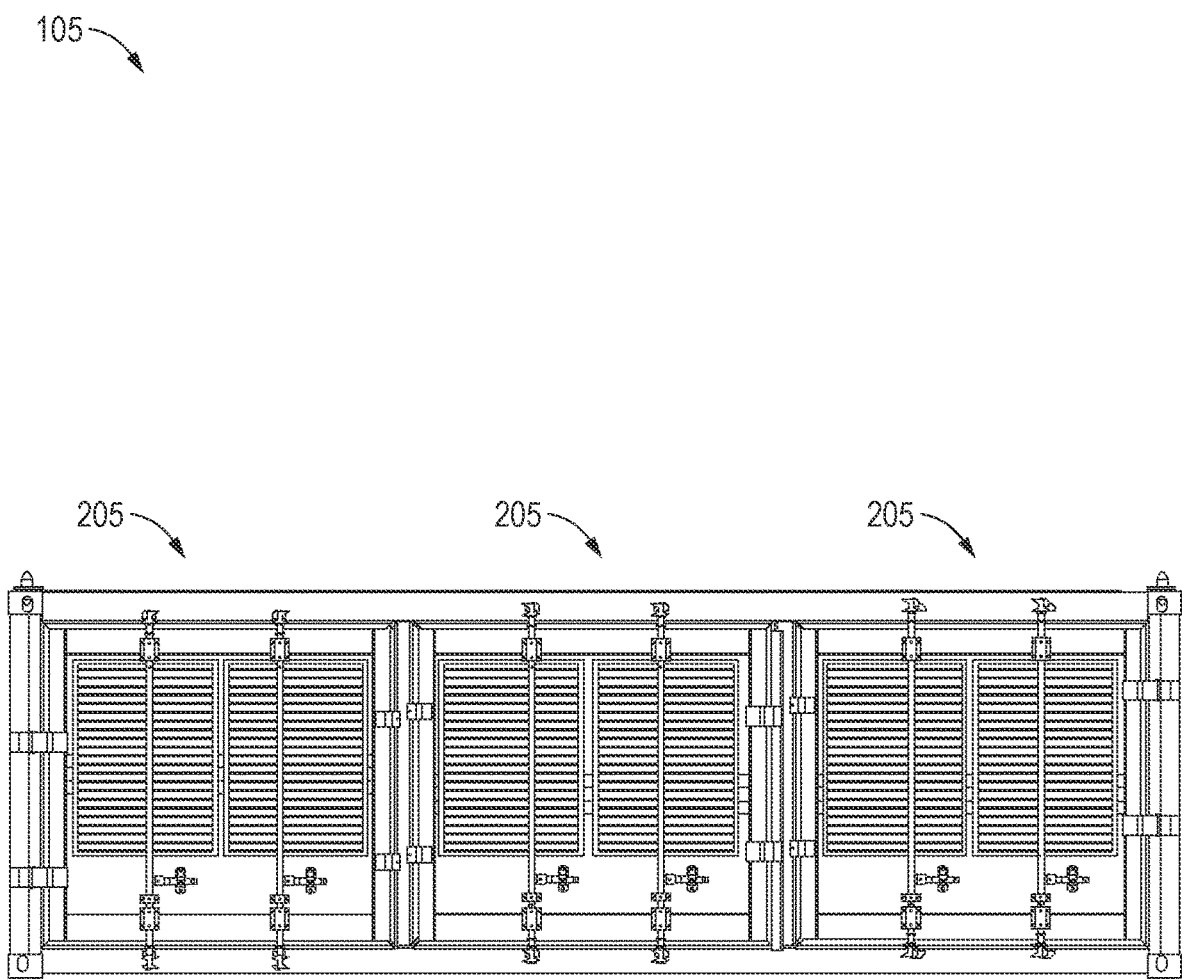
FIG. 2A depicts a front view of an example standoff block of the stackable and modular forced-air BESS.
Figure 2B:
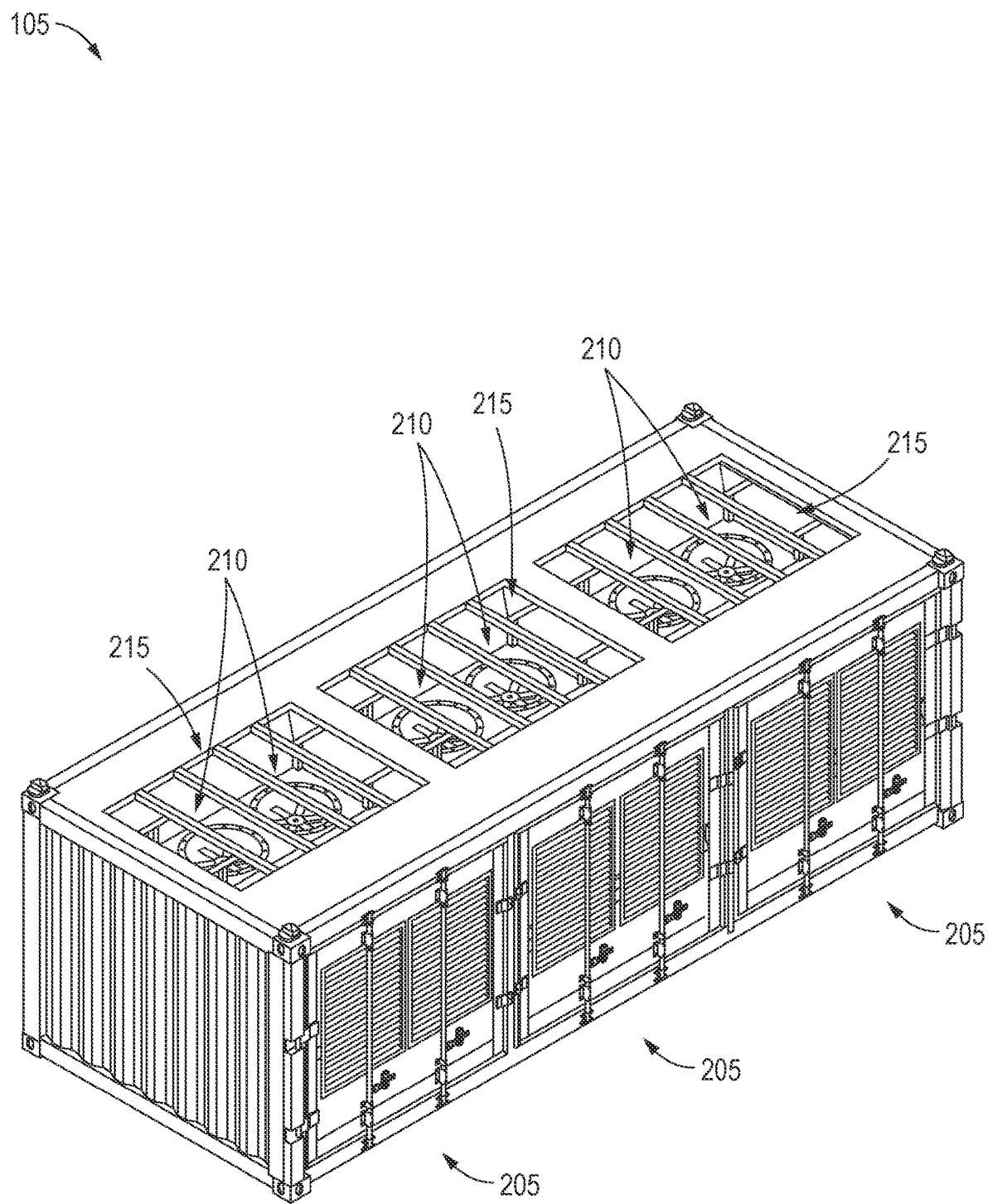
FIG. 2B depicts a top and side view of the example standoff block of the stackable and modular forced-air BESS.

FIG. 2A depicts a front view of an example standoff block 105 of the stackable and modular forced-air BESS 100. FIG. 2B depicts a top and side view of the example standoff block 105 of the stackable and modular forced-air BESS 100.

The standoff block 105 may be interposed between the ground and the next lowest building block (e.g., the adjacent battery block 110). As shown in FIG. 2A, the standoff block 105 may include one or more access panels 205 that may allow an operator to access components inside the standoff block 105, such as for installation, repair, or other purposes.

As shown in FIG. 2B, the standoff block 105 may house one or more forced-air components 210, such as circulating fans. As shown, the standoff block 105 may include one or more flow interfaces 215, such as openings or vents at the top of standoff block 105, which can be connected to the flow interfaces of the lowest building block. Although not shown in the figures, the standoff block 105 may further include one or more flow interfaces, for example at the bottom of the standoff block 105, to allow air (and/or electricity) to enter at the bottom of the stack.

The standoff block may be opened to ambient air at its inlet and the outside air is circulated by fans into the stacked containers at the bottom of the stack and exits at the top.

Figure 3A:
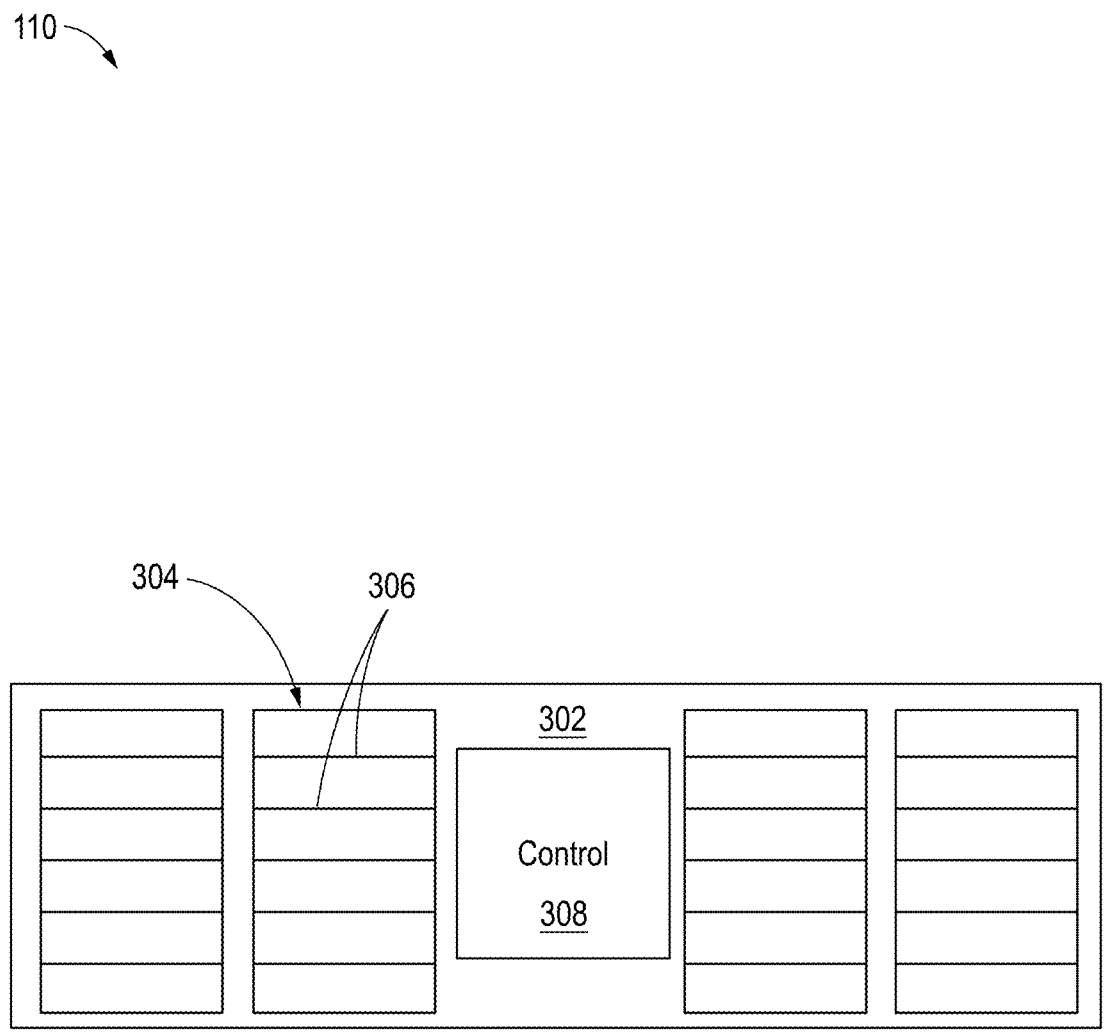
FIG. 3A depicts an example battery block of the stackable and modular forced-air BESS.

FIG. 3A depicts example components of an example battery block 110 of the stackable and modular forced-air BESS 100.

In some embodiments, the battery block 110 includes a housing that is a standard, or modified, ISO shipping container. The battery block 110 may be configured to be stackable. For example, the battery block 110 may include mechanical features and properties to support stacking with a plurality of other building blocks. Each battery block 110 may include a plurality of locking elements such as twists locks to secure the building blocks together. Each battery block 110 may include at least one locking element at its lower end and one at its upper end, preferably, including at least two or four locking elements at each of the upper and lower end. The locking elements may be distributed around the edges of the battery block 110. For example, if the battery block 110 is parallelepipedal, a locking element may be situated near each corner of the upper and lower faces of the battery block 110.

As shown in FIG. 3A, a battery block 110 a housing 302, one or more battery banks 304 of rechargeable batteries 306, and a control system 308. The battery bank 304 may be a collection of multiple rechargeable batteries 306, connected in series or parallel, to provide a target voltage and current capacity. The batteries 306 used in battery bank 304 can be lithium-ion, lead-acid, nickel-hydrogen, or other types of rechargeable batteries, depending on the specific application and requirements. The control system 308 may manage the operation of the battery bank 304, including monitoring the battery bank 304 state of charge, controlling an inverter's output, and protecting the battery bank 304 from overcharging, over-discharging, and other faults. The control system 308 may include an energy management system (EMS). The energy management system is responsible for optimizing the operation of the BESS to meet the specific requirements of the application. The energy management system takes into account factors such as power demand, electricity prices, renewable energy generation, and grid conditions to determine the optimal charging and discharging strategies for the battery bank 304. Control system 308 may use intelligent battery software algorithms to coordinate energy production and decide when to keep the energy to provide energy reserves or to release the energy to the grid.

In one embodiment, the batteries 306 may be nickel-hydrogen batteries, however, it should be understood that the disclosure applies to any type of electrochemical battery including lithium-ion, magnesium-ion, metal-air, nickel-zinc, etc.

Figure 3B:
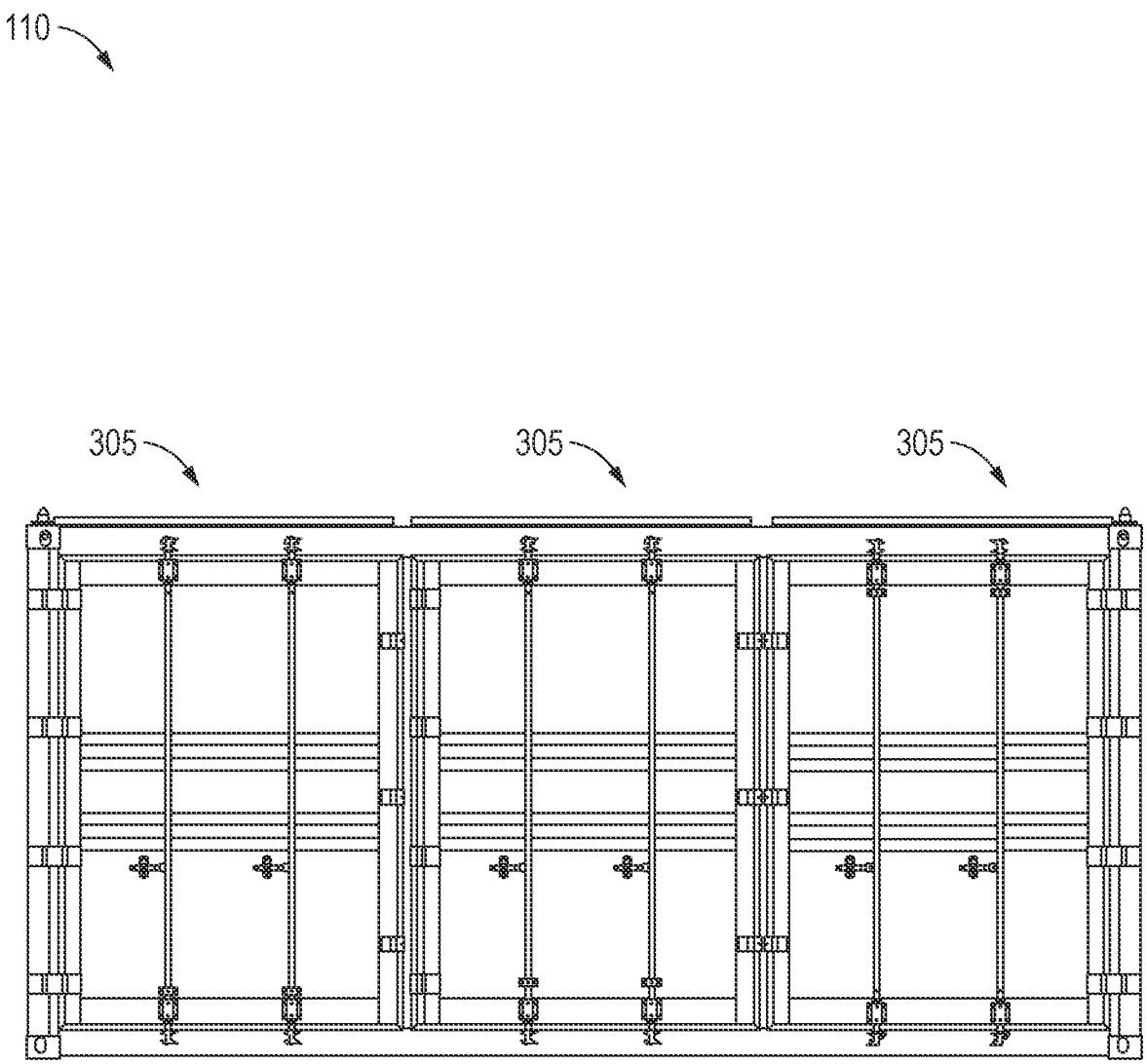
FIG. 3B depicts a front view of the example battery block of the stackable and modular forced-air BESS.
Figure 3C:
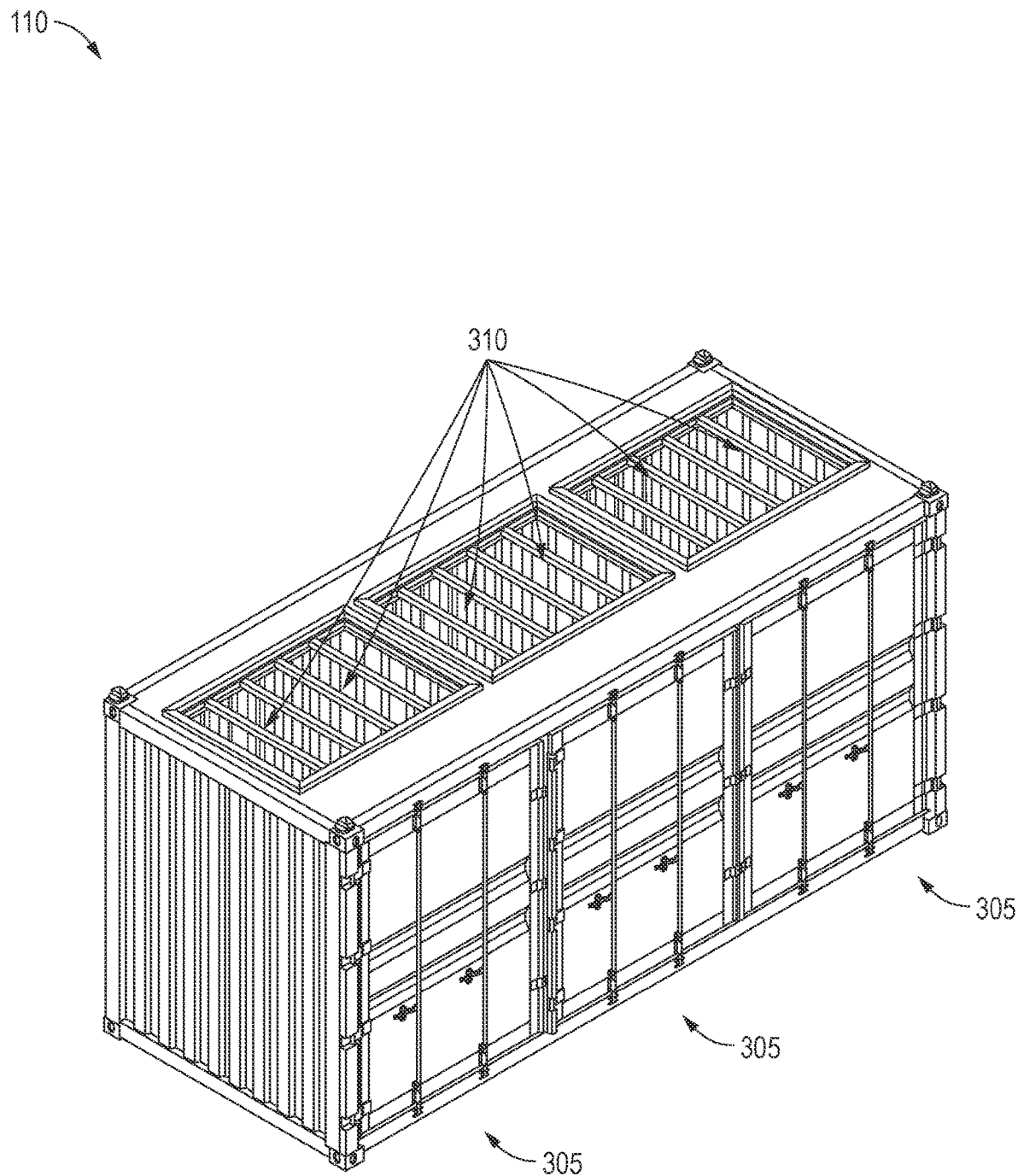
FIG. 3C depicts a top and side view of the example battery block of the stackable and modular forced-air BESS.

FIG. 3B depicts a front view of the example battery block 110 of the stackable and modular forced-air BESS_100. FIG. 3C depicts a top and side view of the example battery block 110 of the stackable and modular forced-air BESS 100.

As shown in FIG. 3B, the battery block 110 may include one or more access panels 305 that may allow an operator to access components inside the battery block 110, such as for installation, repair, or other purposes.

As shown in FIG. 3C, the battery block 110 may include one or more air and/or electricity flow interfaces 310. Air flow interfaces 310 allows a flow of air to enter and exit the battery block 110 through the lower and upper faces of the block to cool the elements contained within each of the building blocks. As shown, the battery block 110 may include flow interfaces 310, such as openings or vents at the top of battery block 110, which can be connected to the flow interfaces of the next lowest building block to allow air to exit from the top of the battery block 110 to the next building block. Although not shown in the figures, the battery block 110 may further include one or more flow interfaces, for example at the bottom of the battery block 110, to allow air to enter at the bottom of the battery block 110 from the building block below that battery block 110. A flow interface may include a sealing element to prevent exchange of air between interior and exterior of the building block.

In alternative embodiments, the air flow interface may include at least a first flow connector on one side of the block and at least a second flow connector, complementary from the first electrical connector and arranged so that, when the blocks are stacked, the second flow connector from the upper block interconnects with the first flow connector of the lower block. The same may be applicable to other blocks of the BESS 100 and/or to other BESS shown in this application.

In other embodiments, the electricity flow interfaces may include at least a first electrical connector on one side of the block and at least a second electrical connector, complementary from the first electrical connector and arranged so that, when the blocks are stacked, the second electrical connector from the upper block interconnects with the first electrical connector of the lower block. The same may be applicable to other blocks of the BESS 100 and/or to other BESS shown in this application.

Figure 4A:
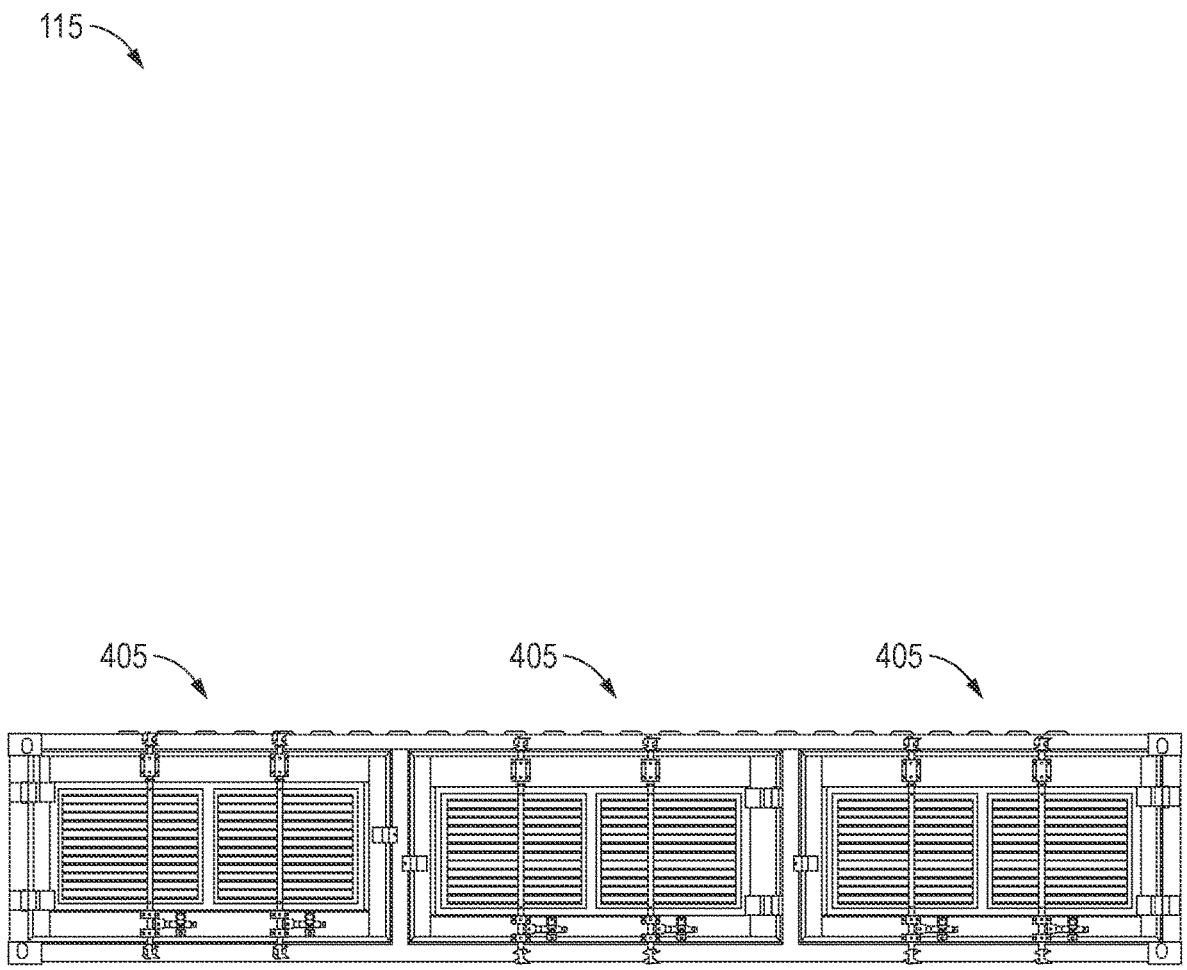
FIG. 4A depicts a front view of an example cap block of the stackable and modular forced-air BESS.
Figure 4B:
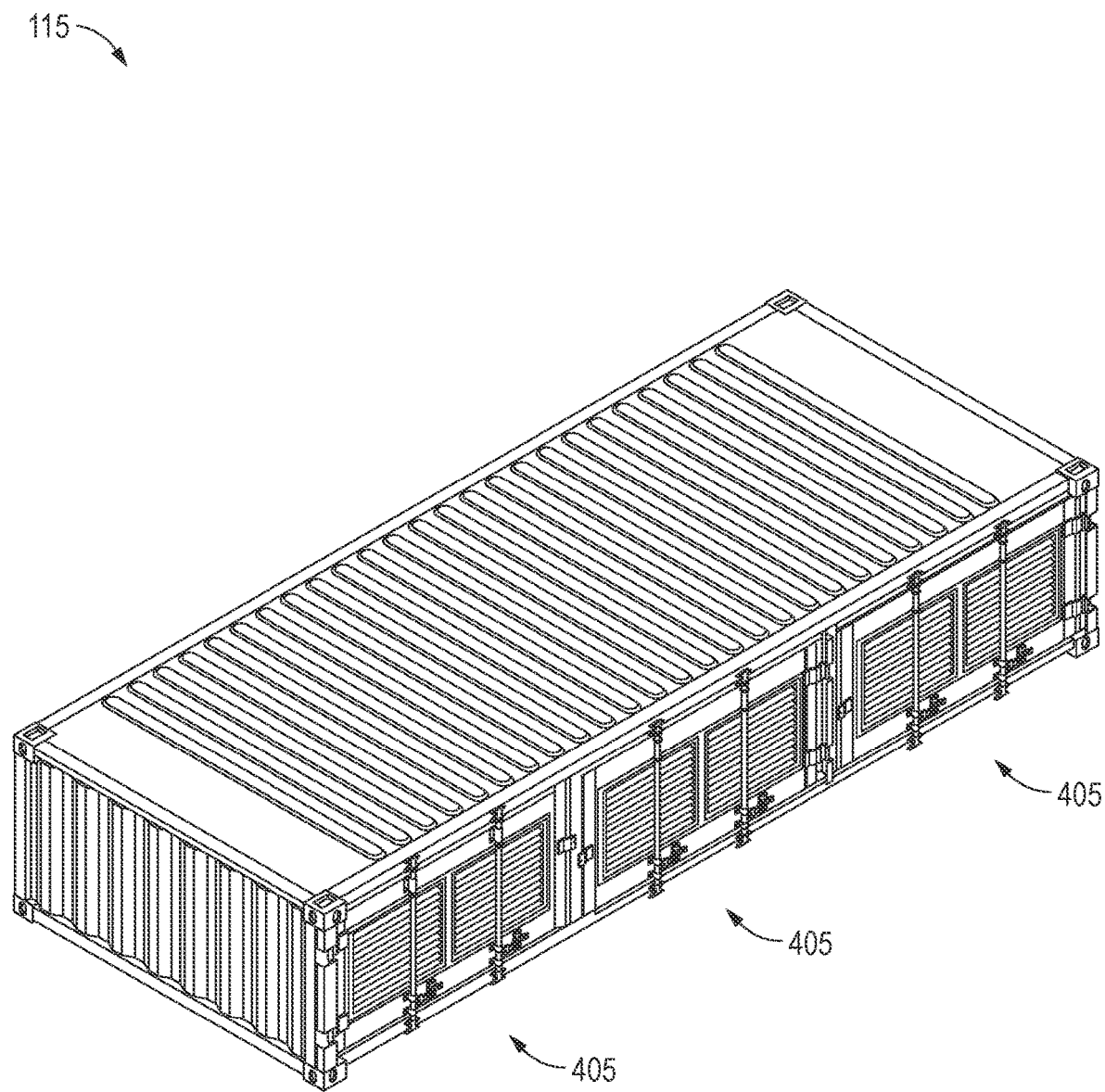
FIG. 4B depicts a top and side view of the example cap block of the stackable and modular forced-air BESS.

FIG. 4A depicts a front view of an example cap block 115 (e.g., a cap module) of the stackable and modular forced-air BESS 100. FIG. 4B depicts a top and side view of the example cap block 115 of the stackable and modular forced-air BESS 100. The cap block 115 may cover the uppermost building block (e.g., the top battery block 110 in the stack) to protect the building block from the environment (e.g., such as sun irradiance, rain, or other environmental elements).

As shown in FIG. 4A, the cap block 115 may include one or more access panels 405 that may allow an operator to access components inside the cap block 115, such as for installation, repair, or other purposes.

Although not shown in the figures, the cap block 115 may include one air and/or electricity flow interfaces. The cap block 115 may include one or more flow interfaces at the lower face of the cap block 115 to allow air to enter the cap block 115 from the adjacent building block below (e.g., the top battery block 110). The cap block 115 may include one or more flow interfaces at the upper face of the cap block 115 to allow air to exit from the top of the stack.

The modular stackable building blocks may allow for many flexible configurations of the BESS. FIG. 5 depicts a top and side view of a configuration of a clustered BESS 500 of four example stackable and modular forced-air BESS 100. As shown in FIG. 5, multiple modular forced-air BESS 100 stacks can be grouped next to each to form the clustered BESS 500. FIG. 6 depicts a top and side view of a configuration of four clusters of example stackable and modular forced-air BESSs. As shown in FIG. 6, multiple modular forced-air clustered BESS 500 stacks can be grouped next to each other. Accordingly, the stacked and modular forced-air BESS 100 can achieve high energy density, while also being efficiently cooled.

In some embodiments, a storage system with the stacked and modular forced-air BESS 100 may include additional blocks, such as a power module containing a power system and/or additional elements to connect the energy storage system to the grid, such as an inverter, a transformer, power lines, etc. An inverter module including a bidirectional AC-DC (alternating current-direct current) converter and an isolation transformer module. In some embodiments, these additional blocks may be located on the ground next to the stacks. In some embodiments, these additional blocks may be located in the stack. In some embodiments, one or more of the additional blocks may be shared by multiple module BESS stacks, by a clustered BESS, or by multiple clustered BESS.

FIG. 7A-FIG. 11 illustrate example active cooled battery energy storage system configurations.

Figure 7A:
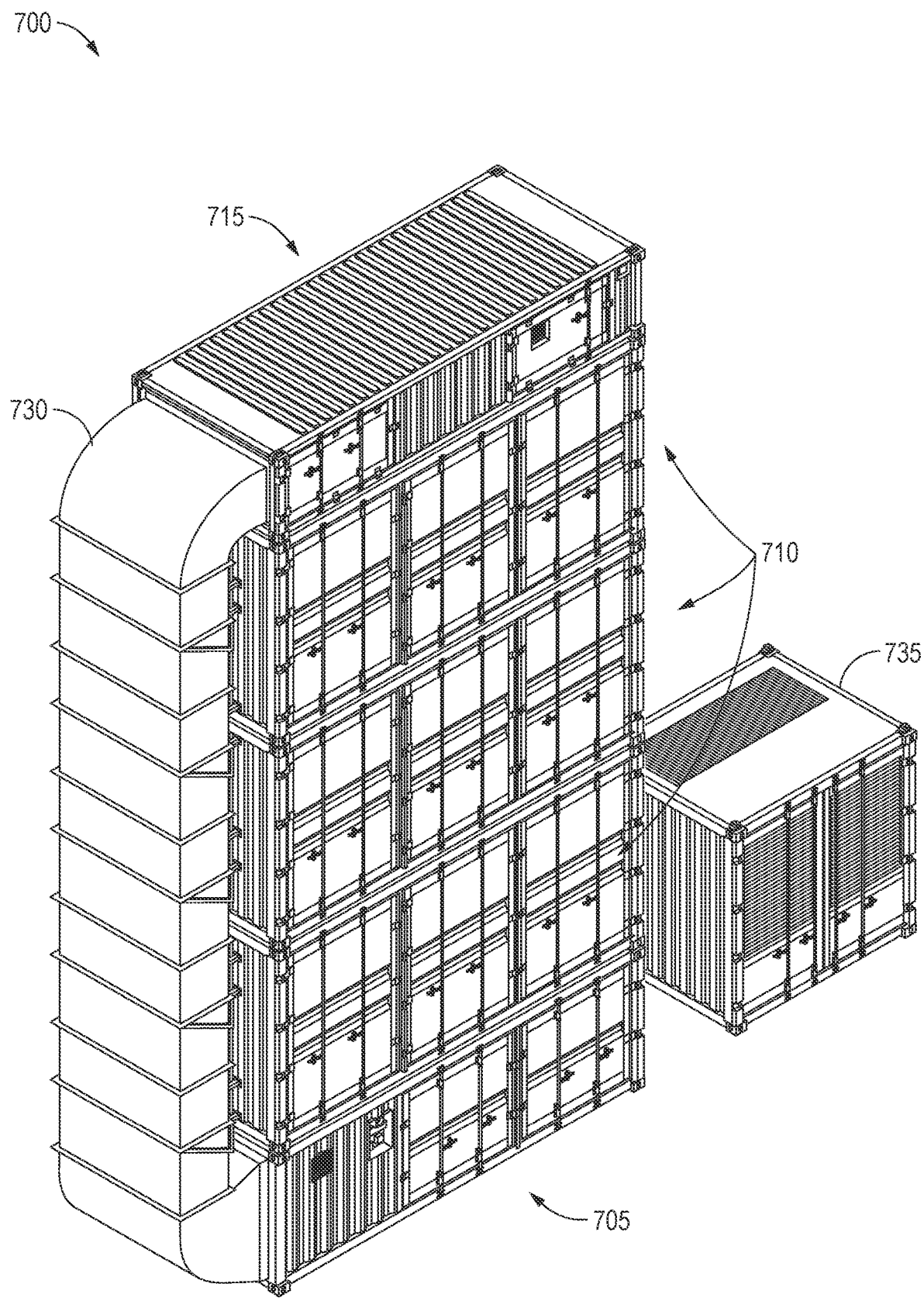
FIG. 7A depicts a front view of an example stackable and modular active-cooled BESS.
Figure 7B:
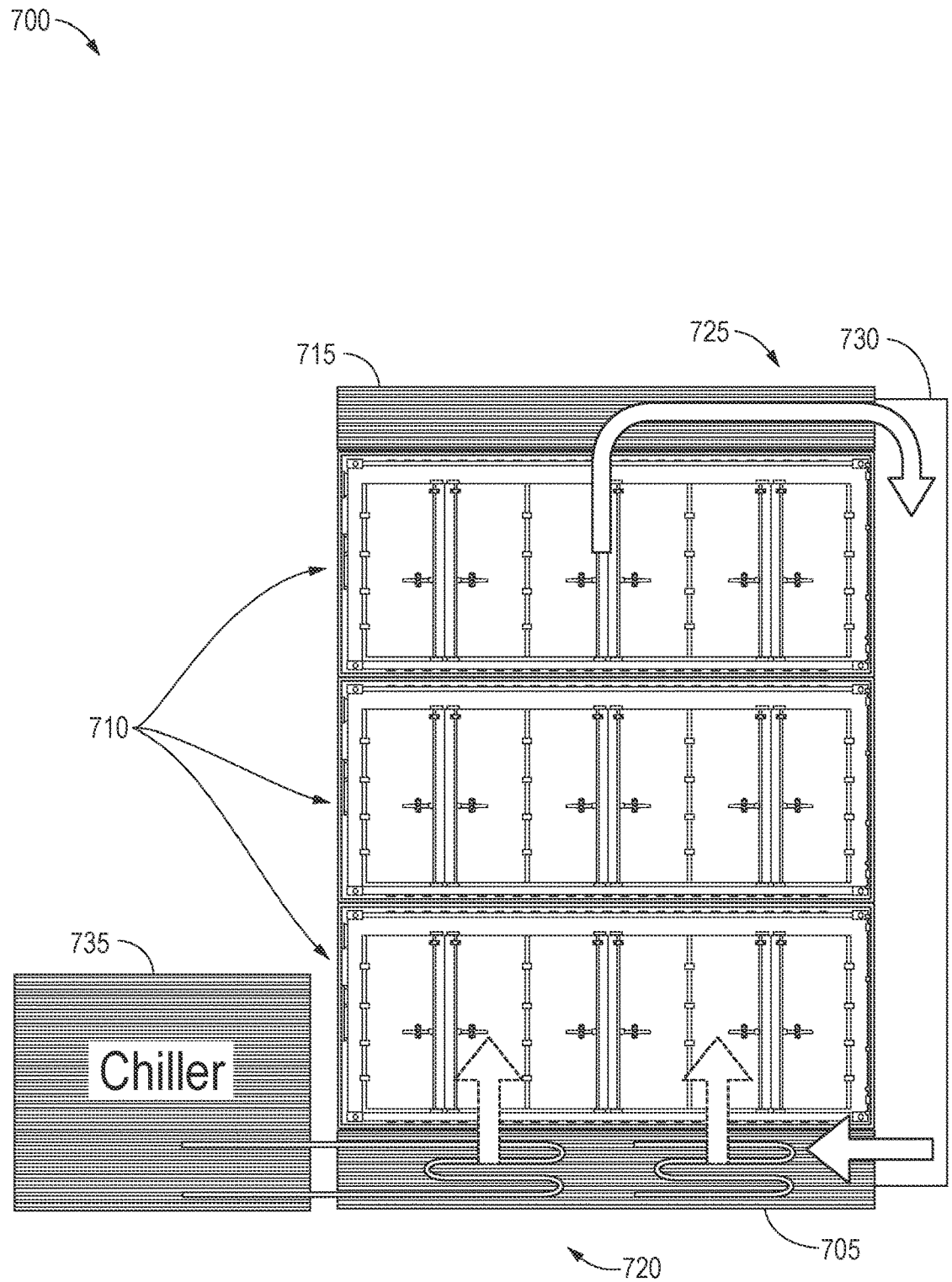
FIG. 7B depicts a top and side view of the example stackable and modular active-cooled BESS.

FIG. 7A depicts a front view of an example stackable and modular active-cooled BESS 700. FIG. 7B depicts a top and side view of the example stackable and modular active-cooled BESS 700.

In the example illustrated in FIG. 7A and FIG. 7B, the modular battery energy storage system includes five stacked blocks: a standoff block 705, three battery blocks 710 containing elements of the energy storage, and a cap block 715. The stacked building blocks are stacked vertically, from bottom to top, with the standoff block 705, a first battery block 710 (i.e., containing one or more battery packs, also designated a battery DC block), a second battery block 710, a third battery block 710, and the cap block 715.

While the example modular BESS illustrated in FIG. 1A and FIG. 1B, includes five stacked building blocks, the modular BESS may include any number of blocks, fewer or greater than five, with at least one battery block 110.

Figure 10:
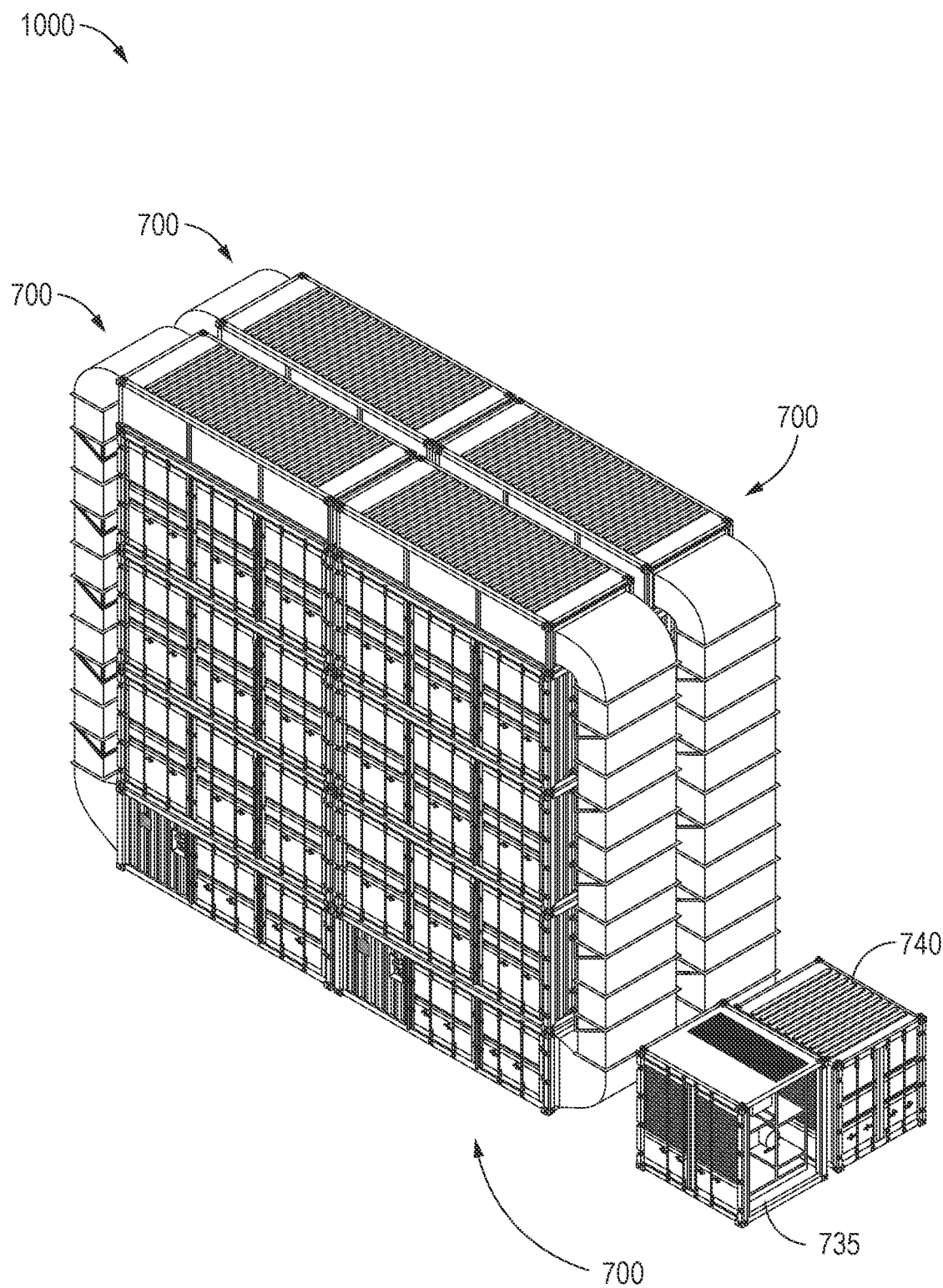
FIG. 10 depicts a top and side view of a configuration of a cluster of four example stackable and modular active-cooled BESSs.
Figure 11:
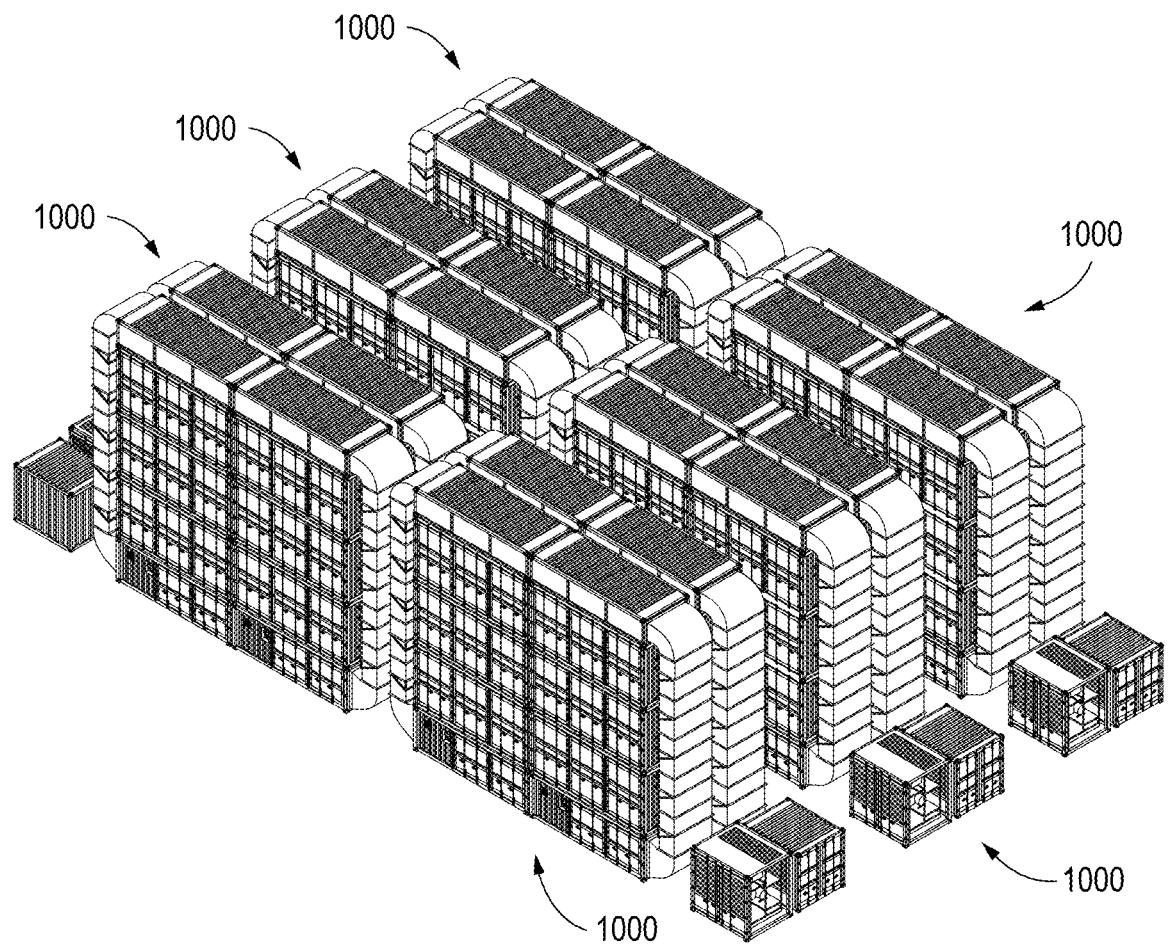
FIG. 11 depicts a top and side view of a configuration of six clusters of example stackable and modular active-cooled BESSs.

The example modular active-cooled BESS 700 illustrates building blocks stacked in the vertical direction, however, the modular active-cooled BESS 700 may, additionally or alternatively, include a plurality of vertical stacks arranged side-by-side or in the vicinity of one another as illustrated in FIG. 10 and FIG. 11 discussed in more detail below. Each stack of such a system may be of different height (e.g., different number of building blocks), composition (e.g., different types of building blocks), etc.

In some aspects, the battery blocks 710 are connected in series.

In some aspects, each of the building blocks in the modular active-cooled BESS 700 are connected to the adjacent building blocks stacked above and below the respective building block. For example, the building blocks may be connected by twist locks (e.g., by twist locks on both sides of the building block), or other type of locking mechanism.

In some aspects, the building blocks in the modular active-cooled BESS 700 include electrical and/or air flow lines or other interfaces between each adjacent building block in the stack, as discussed in more detail below with respect to FIGS. 8A-9B. In some embodiments, the building blocks may each include a plurality of flow interfaces and/or electrical interfaces at different locations on the upper and/or lower faces of the container. The interfaces may be generally situated at a common location on the different building blocks to enable connection with other stacked building blocks.

In some embodiments, the building blocks include electrical interfaces at the upper and lower faces of each building block. Electrical connections (e.g., power connections such as DC high voltage connections, or communication connections such as communication buses) may be connected through the electrical interfaces at the lower and upper faces of the building blocks. The electrical interface may include a sealing element to prevent exchange of electricity between interior and exterior of the building block.

In some embodiments, the building blocks include flow interfaces at the lower (floor) and upper (ceiling) sides of each building block, allowing cool air 720 to enter and flow vertically from the bottom stack and warm air 725 to exit from the top of the stack.

In some embodiments, the stackable and modular active-cooled BESS 700 includes a cooling system block 735 that can be used to cool down the system. The cooling system block 735 may provide actively cooled air 720 to the stack, such as to air interface at the bottom of standoff block 705. For example, the cooling system block 735 may be connected to the stack via a duct at the bottom of the stack (e.g., connection through the standoff module) and a duct at the top of the stack (e.g., through the cap block 715). A circulation duct 730 may recirculate warm air 725 that exits from the top of the stack back to the cooling system block 735 to be actively cooled and then re-introduced to the bottom of the stack.

In some embodiments, the cooling system block 735 uses a refrigerant cycle where the air in the stack is looped and cooled down due to a connection to an evaporator of the active cooling system. The connection can be direct, where the same air that is circulated around the cells is circulating through the evaporator, or indirect, where the air that is circulated around the cells is circulated through a heat exchanger (e.g., via openings).

In some embodiments, an energy storage system with the stacked and modular active-cooled BESS 700 may include a power module containing a power system and/or additional elements to connect the energy storage system to the grid, such as an inverter, a transformer, power lines, etc.

In some embodiments, the cooling system block 735 and/or the power module may be located on the ground next to the stack (e.g., for ease of maintenance and service). In some embodiments, the cooling system block 735 and/or the power module may be located in the stack. In some embodiments, one or more of the additional blocks may be shared by multiple module BESS stacks, by a clustered BESS, or by multiple clustered BESS as discussed in more detail below with respect to the FIGS. 10-11.

Figure 8A:
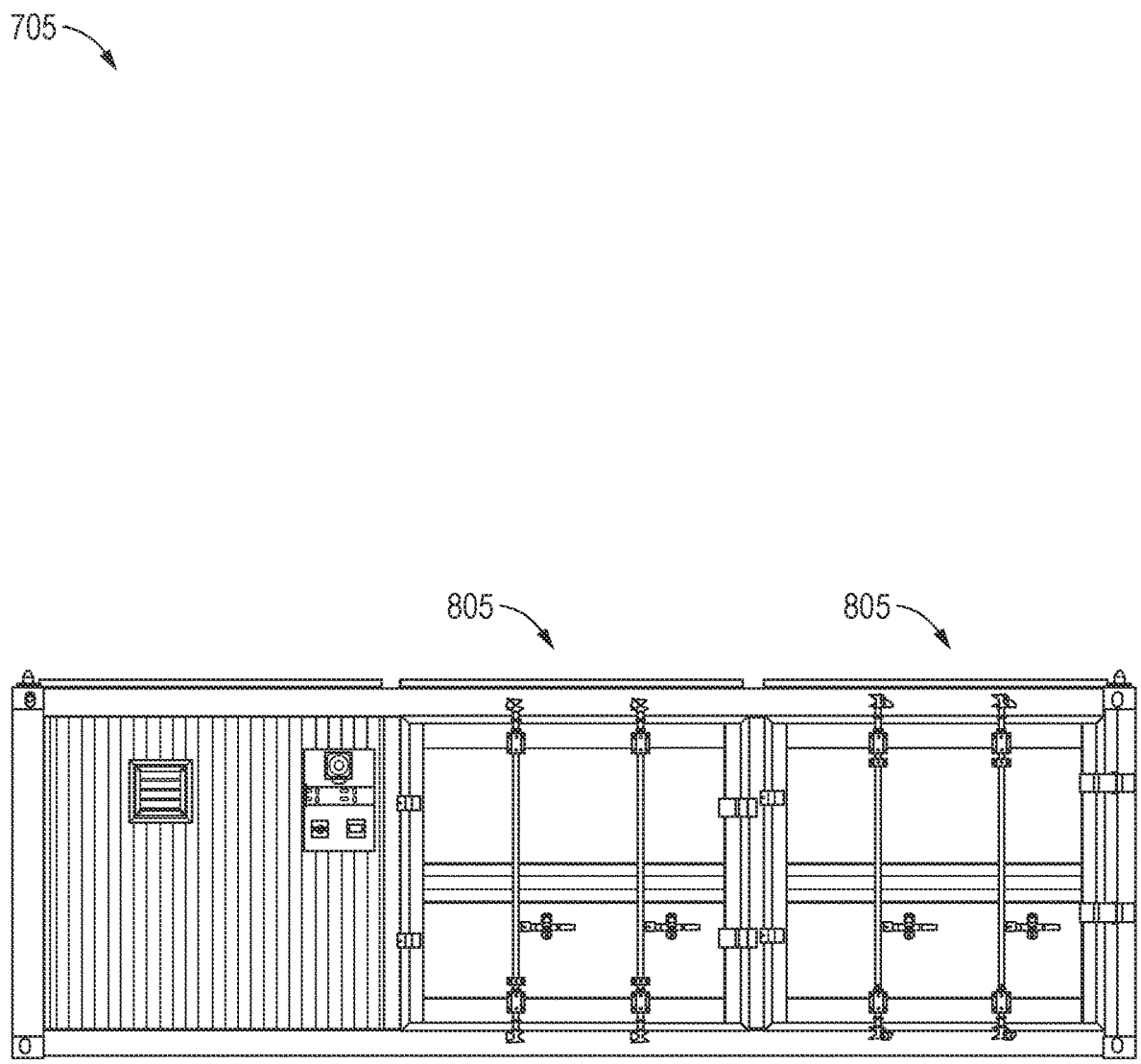
FIG. 8A depicts a front view of an example standoff block of the stackable and modular active-cooled BESS.

FIG. 8A depicts a front view of an example standoff block 705 of the stackable and modular active-cooled BESS 700. The standoff block 705 may be interposed between the ground and the next lowest building block (e.g., the adjacent battery block 710). As shown in FIG. 8A, the standoff block 705 may include one or more access panels 805 that may allow an operator to access components inside the standoff block 705, such as for installation, repair, or other purposes.

Figure 8B:
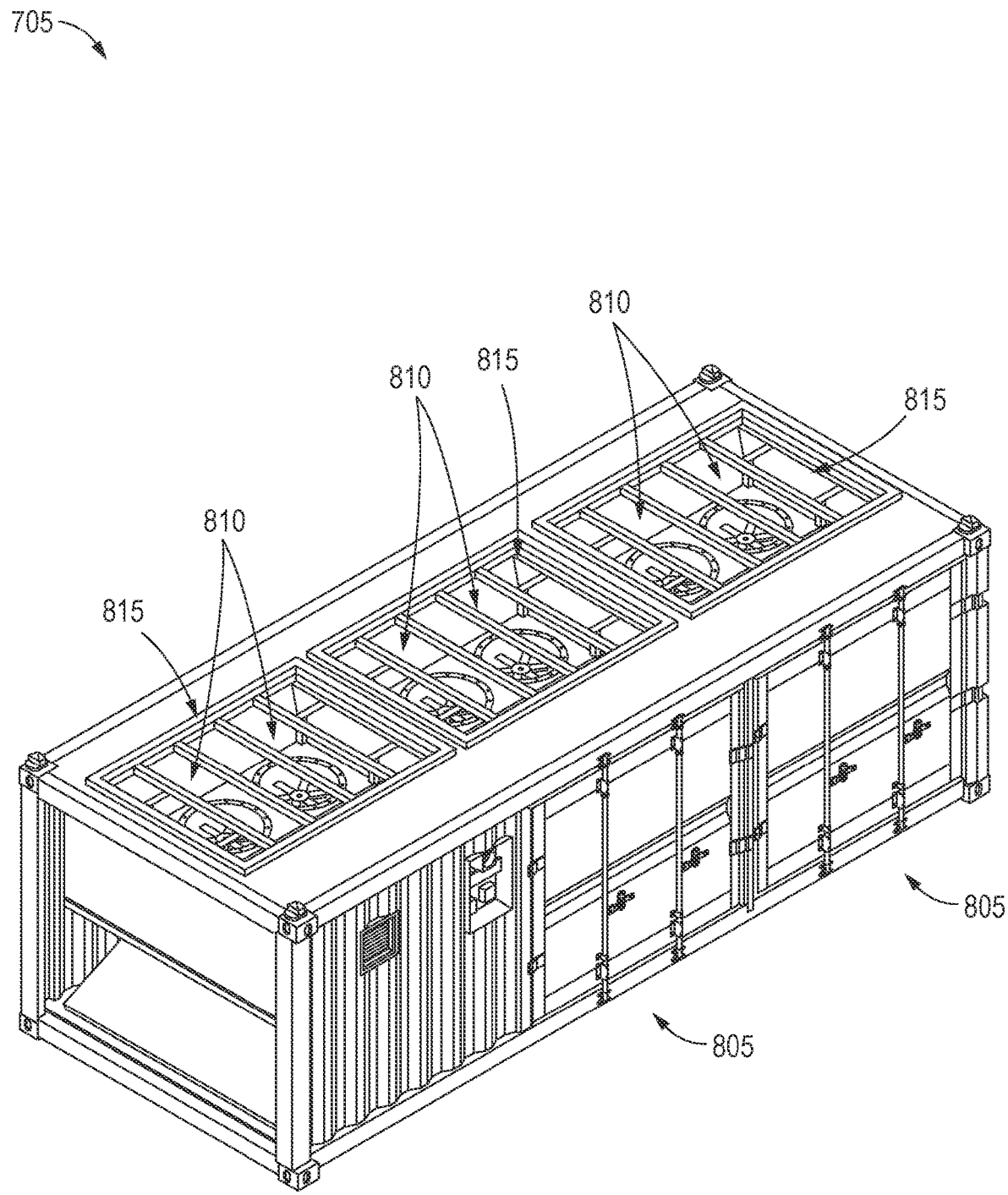
FIG. 8B depicts a top and side view of the example standoff block of the stackable and modular active-cooled BESS.

FIG. 8B depicts a top and side view of the example standoff block 705 of the stackable and modular active-cooled BESS 700.

As shown in FIG. 8B, the standoff block 705 may house one or more forced-air components 810, such as circulating fans. As shown, the standoff block 705 may include one or more flow interfaces 815, such as openings or vents at the top of standoff block 705, which can be connected to the flow interfaces of the lowest building block. The standoff block 705 may include one or more flow interfaces, for example at the bottom or sides of the standoff block 705, to allow air (and/or electricity) to enter at the bottom of the stack. As shown, the standoff block 705 may include one or more flow interfaces 815 which may couple to the circulation duct 730 and/or the cooling system block 735.

In some embodiments, the standoff block 705 is the same for both the forced-air BESS 100 and the active-cooled BESS 700. In some embodiments, the standoff block 705 is the same for both the forced-air BESS 100 and the active-cooled BESS 700 except for using different flow interfaces. For example, as illustrated, the standoff block 105 may include a flow interfaces at the bottom face of the standoff block 105 to allow ambient air to enter while the standoff block 705 may instead have a flow interface (e.g., an opening) at a side face of the standoff block 705 to allow actively-cooled air to enter from the circulation duct 730 and/or the cooling system block 735.

In some embodiments, the standoff block 705 houses an evaporator (not shown).

In some embodiments, the standoff block 705 houses a heat exchanger.

In some embodiments, the battery blocks 710 in the active-cooled BESS 700 are the same as the battery blocks 110 of the forced-air BESS 100.

Figure 9A:
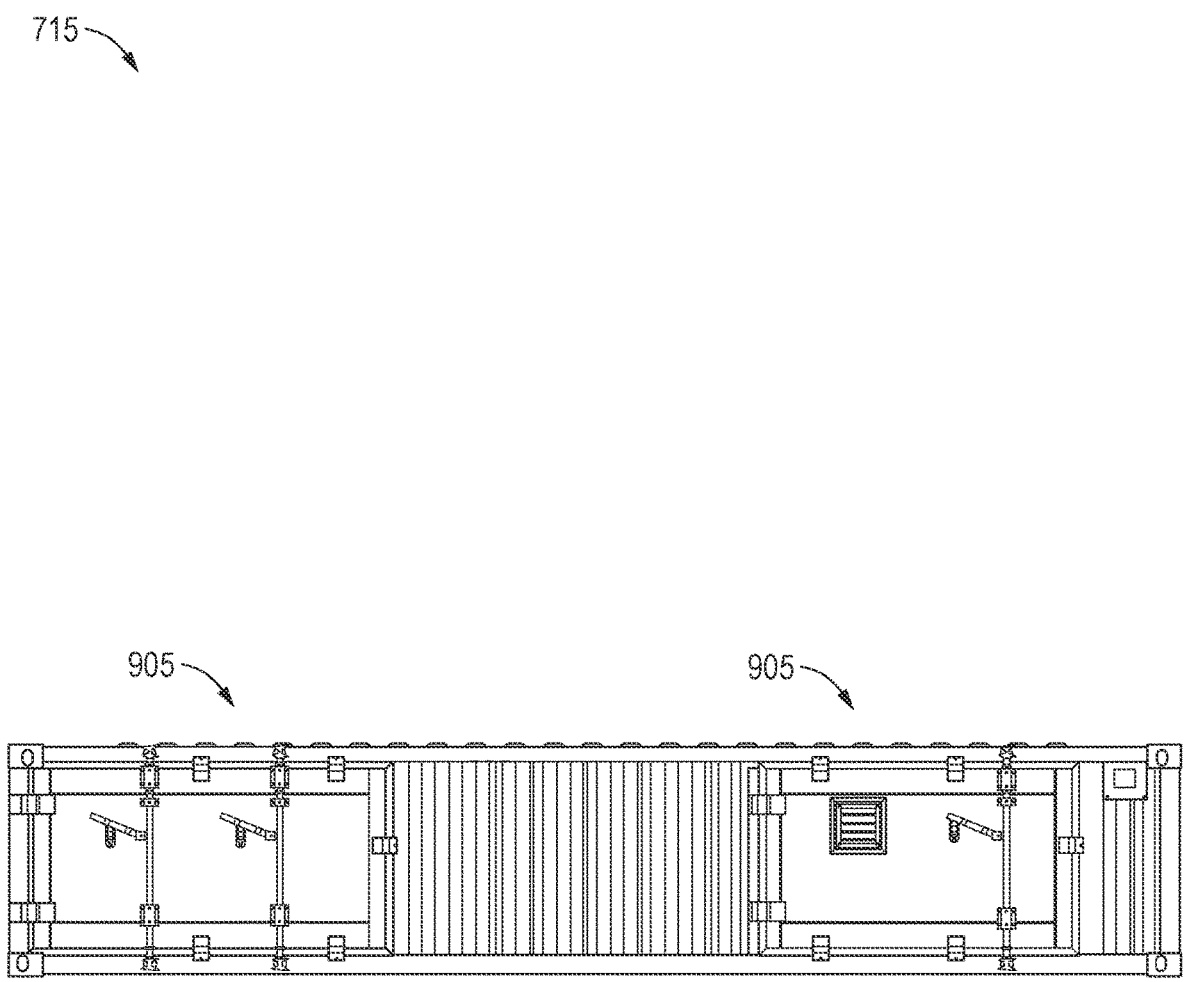
FIG. 9A depicts a front view of an example cap block of the stackable and modular active-cooled BESS.
Figure 9B:
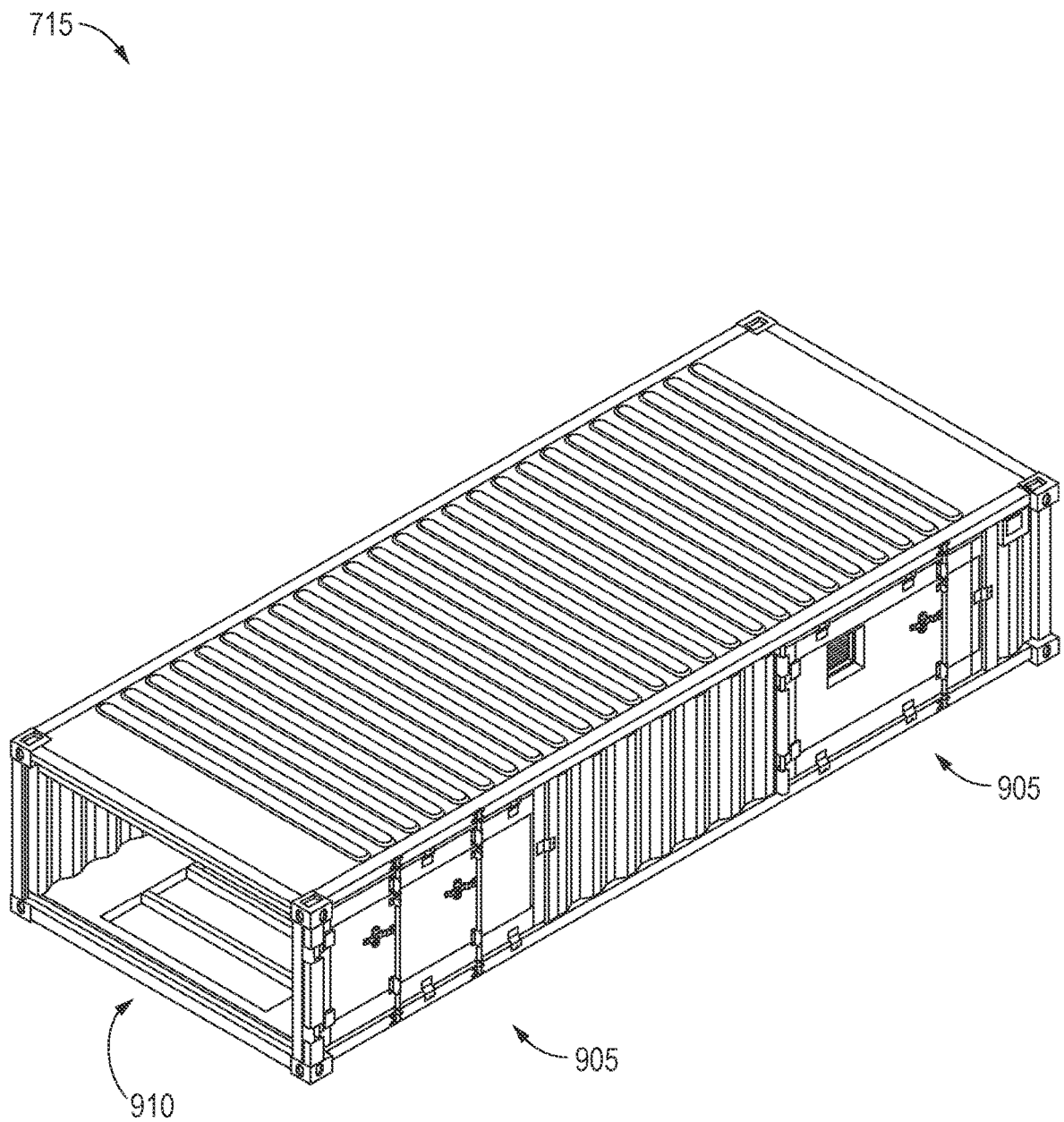
FIG. 9B depicts a top and side view of the example cap block of the stackable and modular active-cooled BESS.

FIG. 9A depicts a front view of an example cap block 715 of the stackable and modular active-cooled BESS 700. FIG. 9B depicts a top and side view of the example cap block 715 of the stackable and modular active-cooled BESS 700. The cap block 715 may cover the uppermost building block (e.g., the top battery block 710 in the stack) to protect the building block from the environment (e.g., such as sun irradiance, rain, or other environmental elements).

As shown in FIG. 9A, the cap block 715 may include one or more access panels 905 that may allow an operator to access components inside the cap block 715, such as for installation, repair, or other purposes.

As shown in FIG. 9B, the cap block 715 may include one or more air and/or electricity flow interfaces 910. For example, the cap block 715 may include one or more flow interfaces 910 (e.g., an opening) at a side face of the cap block 715 that couples with the circulation duct 730 to recirculate the warm air 725 exiting the cap block 715.

Although not shown, the cap block 715 may include one or more air and/or electricity flow interfaces at a bottom face of the cap block 715 to allow air to enter the cap block 715 from the adjacent building block below (e.g., the top battery block 710). The cap block 715 may include one or more flow interfaces at the upper face of the cap block 715 to allow air to exit from the top of the stack.

In some embodiments, the cap block 715 for the active-cooled BESS 700 is the same as the cap block 115 for the forced-air BESS 100. In some embodiments, the cap block is the same for both the forced-air BESS 100 and the active-cooled BESS 700 except for using different flow interfaces. For example, as illustrated, the cap block 115 may include a flow interfaces at the top face of the cap block 115 to allow ambient air to exit while the cap block 715 may instead have a flow interface (e.g., an opening) at a side face of the cap block 715 to allow warm air to be recirculated through the circulation duct 730.

The modular stackable building blocks may allow for many flexible configurations of the BESS. FIG. 10 depicts a top and side view of a configuration of a clustered BESS 1000 of four example stackable and modular active-cooled BESSs. As shown in FIG. 10, multiple modular active-cooled BESS 700 stacks can be grouped next to each to form the clustered BESS 1000. FIG. 11 depicts a top and side view of a configuration of six clustered BESS 1000 of example stackable and modular active-cooled BESSs 700. As shown in FIG. 11, multiple modular active-cooled clustered BESS 1000 stacks can be grouped next to each other. Accordingly, the stacked and modular active-cooled BESS 700 can achieve high energy density, while also being efficiently cooled.

In some embodiments, one or more of the additional blocks may be shared by multiple modular active-cooled BESS 700 stacks, by a clustered BESS 1000, or by multiple clustered BESSs 1000. In the example illustrated in FIGS. 10-11, each clustered BESS 1000 shares a power block 740 and a cooling system block 735. However, the system may include fewer or more stacks that each have an independent power block 740 and/or an independent cooling system block 735 or that share a power block 740 and/or a cooling system block 735.

In some embodiments, the buildings blocks of a BESS stack are configured for both the active-cooled operation and the forced-air operation.

In some embodiments, the cooling system block 735 is configured for smart and energy saving operation.

In some embodiments, the cooling is an open loop system. For example, the cooling (e.g., active central cooling and/or forced-air cooling) may be automatically turned off (and/or the active central cooling is turned off but forced-air cooling is used) when the ambient temperature is low and automatically turned on when the ambient temperature is high.

In some embodiments, the BESS includes temperature sensors. When a temperature sensor monitors that the ambient temperature is lower than a predefined setting value, the system may be opened to ambient air at its inlet and outlet. It is then an open loop system. The cooling can be by the forced-air cooling. When the temperature sensor monitors the ambient temperature is higher than a predefined setting value, the system closes its air inlet and outlets. It is then a closed loop system and the cooling system can be active-cooled.

Figure 12:
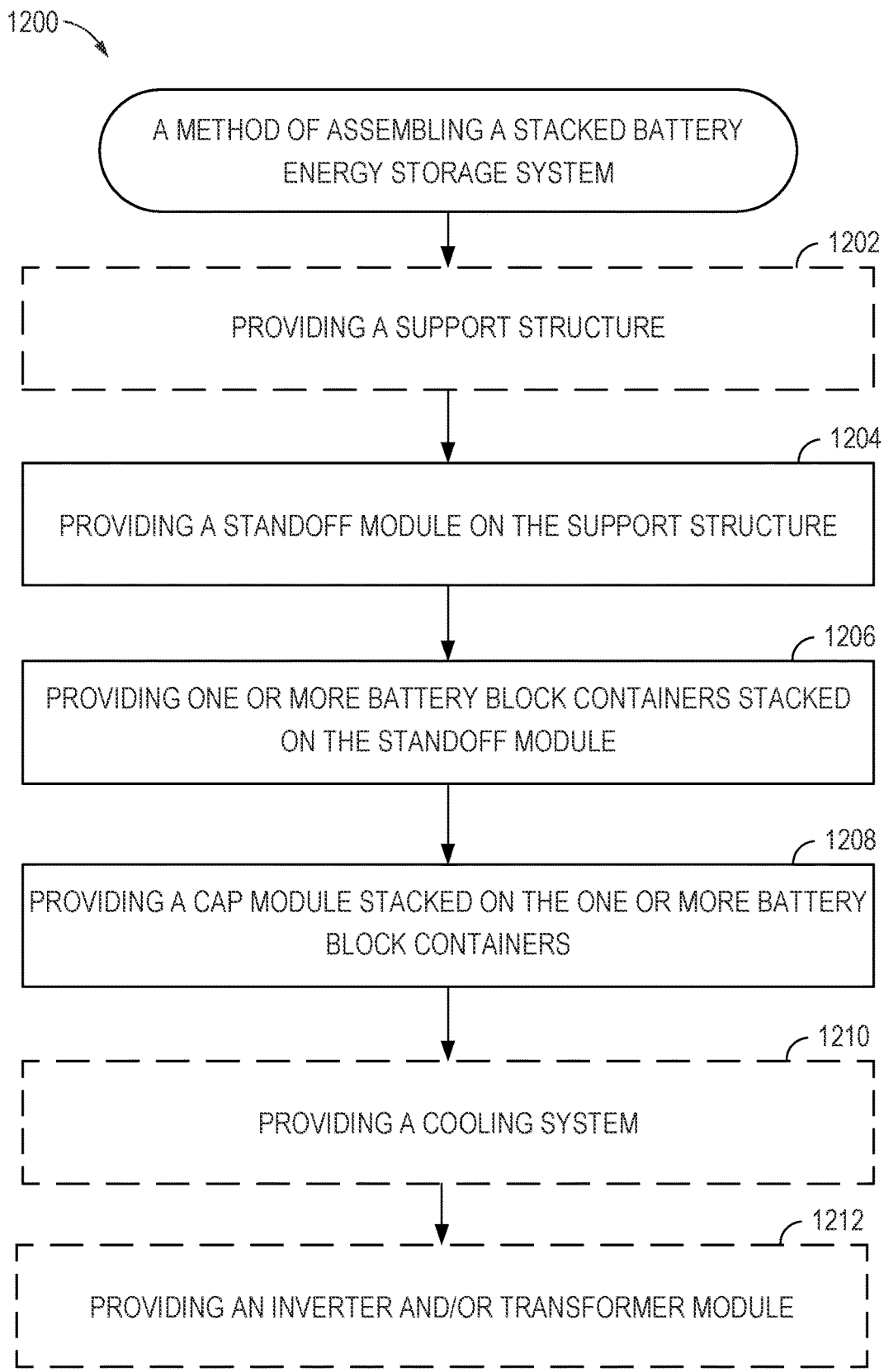
FIG. 12 is a flow diagram depicting an example method for assembling stacked BESS.

FIG. 12 is a flow diagram depicting an example method 1200 for assembling stacked BESS (e.g., such as the BESS 100 or the BESS 700).

As shown, the method 1200 may include, at step 1202, providing a support structure. For example, the support structure may be a cement pad or other suitable supporting structure, on which the stacked BESS can be assembled. In some aspects, the support structure may be the ground.

The method 1200 may include, at step 1204, providing a standoff module (e.g., standoff block 105 as shown in as described with respect to FIGS. 1-6 or a standoff module (e.g., standoff block 705) as shown in as described with respect to FIGS. 7-11) on the support structure in as described with respect to FIGS. 7-11) on the support structure.

The method 1200 may include, at step 1206, providing one or more battery block containers (e.g., battery block 110 as shown in as described with respect to FIGS. 1-6 or battery block 710 as shown in as described with respect to FIGS. 7-11) stacked on the standoff module (ie so that a lower face of the battery block container is disposed on an upper face of the standoff module). The method may include, at step 1206, connecting the one or more battery block containers to the standoff module via corresponding electrical and flow interfaces. In particular, it includes connecting at least one electrical interface of the one or more electrical interfaces of the second container situated on the lower face of the second container to at least one electrical interface of the one or more electrical interfaces of the first container, situated on the upper face of the first container, as well as connecting at least one flow interface, of the one or more flow interfaces of the second container, situated on the lower face of the second container, to at least one flow interfaces, of the one or more flow interfaces, situated on the upper face of the first container.

The method 1200 may include, at step 1208, providing a cap module (e.g., cap block 115 as shown in as described with respect to FIGS. 1-6 or standoff module (e.g., standoff block 705) as shown in as described with respect to FIGS. 7-11) stacked on the one or more battery block containers (i.e., so that a lower face of the cap module is disposed on an upper face of the battery block container). The method may include, at step 1208, connecting the one or more battery block containers to the cap module via corresponding electrical and flow interfaces. In particular, it includes connecting at least one electrical interface of the one or more electrical interfaces of the second container situated on the lower face of the second container to at least one electrical interface of the one or more electrical interfaces of the first container, situated on the upper face of the first container, as well as connecting at least one flow interface, of the one or more flow interfaces of the second container, situated on the lower face of the second container, to at least one flow interfaces, of the one or more flow interfaces, situated on the upper face of the first container.

The method 1200 may include, at step 1210, providing a cooling system (e.g., fans or heat exchanger in standoff module (e.g., standoff block 105) as shown in as described with respect to FIGS. 1-6 or cooling system block 735 as shown in as described with respect to FIGS. 7-11). In some aspects, providing the cooling system includes providing one or more forced-air components 210 (e.g., fans [215] as shown in as described with respect to FIGS. 1-6) in the standoff module. In some aspects, providing the cooling system includes providing an active cooling system (e.g., cooling system block 735 as shown in as described with respect to FIGS. 7-11) external the stack and providing a heat exchanger in the standoff module. In some aspects, providing the cooling system includes providing a circulation duct between the cap module and the standoff module.

In some aspects, providing the cooling system includes providing one or more temperature sensors configured to sense ambient temperature, one or more opening and closing elements configured to open and close a first flow path between the battery block containers and the external environment and a second flow path between the battery block containers and the standoff module or active cooling system module, and providing a controller configured to control the cooling system based on the temperature sensor readings.

The method 1200 may include, at step 1212, providing a power module (e.g., power block 740).

In some aspects, the cooling system and power module are provided external to, for example not stacked with, the plurality of stacked containers including the standoff module, the one or more battery block containers, and the cap module.

In some aspects, the method includes modifying one or more standard shipping containers to provide flow interfaces (e.g., interfaces 215 and 310 as shown in as described with respect to FIGS. 1-6 or interface 310 and 815 as shown in as described with respect to FIGS. 7-11) at one or more upper, lower, or side surfaces of the shipping containers.

EXAMPLE CLAUSES

Implementation examples are described in the following numbered clauses:

Clause 1. An energy storage system comprising: a plurality of stacked containers including a first container and a second container, wherein: each of the plurality of containers includes a housing having an upper face and a lower face; the lower face of the second container is disposed on the upper face of the first container, the first container and the second container forming a stack; at least the second container includes a battery pack within the housing; each of the plurality of containers includes one or more air flow interfaces and one or more electrical interfaces; at least one electrical interface, of the one or more electrical interfaces of the second container, situated on the lower face of the second container is connected to at least one electrical interface, of the one or more electrical interfaces of the first container, situated on the upper face of the first container; and at least one air flow interface, of the one or more air flow interfaces of the second container, situated on the lower face of the second container is connected to at least one air flow interfaces, of the one or more flow interfaces, situated on the upper face of the first container.

Clause 2. The energy storage system of Clause 1, further comprising a third container, wherein: the lower face of the third container is disposed on the upper face of the second container, the third container further forming the stack with the first container and the second container; at least one electrical interface, of the one or more electrical interfaces of the third container, situated on the lower face of the third container is connected to at least one electrical interface, of the one or more electrical interfaces of the second container, situated on the upper face of the second container; and at least one air flow interface, of the one or more air flow interfaces of the third container, situated on the lower face of the third container is connected to at least one air flow interface of the one or more air flow interfaces of the second container, situated on the upper face of the second container.

Clause 3. The energy storage system of any combination of Clauses 1-2, further comprising a fourth container including at least one of: an inverter; a converter; or a transformer.

Clause 4. The energy storage system of Clause 3, wherein the fourth container is located on the ground proximate the stack.

Clause 5. The energy storage system of any combination of Clauses 3-4, wherein the fourth container is in the stack with the first container and the second container.

Clause 6. The energy storage system of any combination of Clauses 1-5, wherein the plurality of stacked containers includes a plurality of containers including battery packs within the respective housings.

Clause 7. The energy storage system of any combination of Clauses 1-6, wherein the first container comprises a standoff module situated between a support of the stack and the first container.

Clause 8. The energy storage system of Clause 7, wherein the standoff module includes at least one fan.

Clause 9. The energy storage system of Clause 8, wherein the standoff module includes at least a second air flow interface, of the one or more air flow interfaces, situated on a side surface or the lower surface of the first container, that connects the standoff module to the outside air.

Clause 10. The energy storage system of Clause 9, wherein: the plurality of containers includes a fifth container; the fifth container comprises a cap module stacked situated at the top of the plurality of stacked containers; and the cap module includes at least a first flow interface, situated on a lower face of the fifth container, connected to the at least one flow interface situated on the upper face of an uppermost container of the stack.

Clause 11. The energy storage system of any combination of Clauses 8-10, wherein: the standoff module includes at least a second air flow interface, of the one or more air flow interfaces of the first container, that connects the standoff module to a circulation duct; and the circulation duct connects to a cooling system module external to the stack.

Clause 12. The energy storage system of Clause 11, wherein: the plurality of containers includes a fifth container; the fifth container comprises a cap module stacked situated at the top of the plurality of stacked containers; the cap module includes at least a first flow interface, situated on a lower face of the fifth container, connected to the at least one flow interface situated on the upper face of an uppermost container of the stack; and the cap module also includes at least a second flow interface that connects the cap module to the circulation duct.

Clause 13. The energy storage system of Clause 12, wherein the cooling system module is located on the ground proximate the stack.

Clause 14. The energy storage system of any combination of Clauses 12-13, wherein the cooling system module is located in one of the plurality of containers in the stack.

Clause 15. The energy storage system of any combination of Clauses 12-14, wherein the cooling system module comprises at least one of: a chiller or a heating ventilation and air conditioning (HVAC) system.

Clause 16. The energy storage system of Clause 15, wherein the cooling system module includes a chiller, and wherein the standoff module includes a heat exchanger.

Clause 17. The energy storage system of any combination of Clauses 11-16, wherein: the standoff module includes at least a third air flow interface, of the one or more air flow interfaces, situated on a side surface or the lower surface of the first container, that connects the standoff module to the outside air; the standoff module includes an opening and closing element configured to open and close the third air flow interface to the outside air; the energy storage system further comprises: one or more temperature sensors configured to sense ambient temperature external to the stack; and a controller configured to close the opening and closing element and activate the cooling system module when the sensed ambient temperature is above a threshold temperature and to open the opening and closing element and deactivate the cooling system module when the sensed ambient temperature is at or below the threshold temperature.

Clause 18. The energy storage system of any combination of Clauses 1-17, further comprising at least a second plurality of stacked containers forming at least a second stack.

Clause 19. The energy storage system of Clause 18, further comprising at least one of: a cooling system module, an inverter module, or a transformer module, and wherein at least one of the cooling module, the inverter module, or the transformer module is connected to the stack and the at least the second stack.

Clause 20. The energy storage system of any combination of Clauses 1-19, wherein each container, of the plurality of containers, is attached to adjacent containers, of the plurality of containers, via twist locks.

Clause 21. An energy storage system comprising: a cooling module; a battery module including: a housing; and at least one battery pack within the housing, wherein the battery module is connected via a first flow path to the cooling module and a second flow path to an external environment, and wherein the cooling module is configured to cool the battery module via the first flow path; an opening and closing element configured to open and close the second flow path; a temperature sensor configured to sense ambient temperature outside the energy storage system; and a controller configured to control the cooling module and the opening and closing element based on the sensed ambient temperature.

Clause 22. The energy storage system of Clause 21, wherein the controller is configured to: open the opening and closing element and deactivate the cooling module when the sensed ambient temperature is below a threshold temperature; and close the opening and closing element and activate the cooling module when the sensed ambient temperature is at or above the threshold temperature.

Clause 23. The energy storage system of any combination of Clauses 21-22, wherein the first flow path connects the cooling module and the battery module in a closed loop.

Clause 24. The energy storage system of any combination of Clauses 21-23, wherein the second flow path connects the battery module to the external environment via an inlet and an outlet.

Clause 25. The energy storage system of any combination of Clauses 21-24, further comprising a plurality of stacked containers forming a stack, wherein: the plurality of stacked containers includes at least a first container and a second container; each container of the plurality of stacked containers includes a housing having an upper face and a lower face; at least one of the first container or the second container forms the battery module; the upper face of the first container is in contact with the lower face of the second container; an electrical interface situated on the lower face of the second container is connected to an electrical interface situated on the upper face of the first container; and an air flow interface situated on the lower face of the second container is connected to an air flow interface situated on the upper face of the first container.

Clause 26. The energy storage system of Clause 25, wherein: the stack further comprises a standoff module stacked with the plurality of containers; and the standoff module is situated between a support located at a lower end of the stack and the first container.

Clause 27. The energy storage system of Clause 26, wherein the standoff module includes at least one fan and at least a first air flow interface, situated on an upper face of the standoff module, connected to an air flow interface situated on the lower face of the first container.

Clause 28. The energy storage system of Clause 27, wherein the standoff module further includes: at least a second air flow interface connecting the standoff module to the cooling module so as to form part of the first flow path; and a third air flow interface connecting the standoff module to ambient air outside the energy storage system so as to form part of the second flow path.

Clause 29. The energy storage system of Clause 28, wherein the stack further comprises a cap module stacked with the first container and the second container, and wherein the cap module is situated at an upper end of the stack.

Clause 30. The energy storage system of Clause 29, wherein the cap module includes at least a first air flow interface connected to an air flow interface of the upper face of an uppermost container of the plurality of stacked containers.

Clause 31. The energy storage system of Clause 30, wherein the cap module further includes: at least a second air flow interface connecting the cap module to the cooling module so as to form part of the first flow path; and a third flow interface connecting the cap module to the ambient air outside the energy storage system so as to form part of the second flow path.

Clause 32. The energy storage system of any combination of Clauses 25-31, further comprising at least one of: an inverter module or a transformer module.

Clause 33. The energy storage system of Clause 32, wherein the energy storage system comprises a plurality of stacks, the plurality of stacks including the stack.

Clause 34. The energy storage system of Clause 33, wherein at least one of: the cooling module, the inverter module, or the transformer module is connected to and shared by the plurality of stacks.

Clause 35. The energy storage system of any combination of Clauses 26-34, wherein the cooling module includes one of a chiller or a heating ventilation and air conditioning (HVAC) system.

Clause 36. The energy storage system of Clause 35, wherein the cooling module includes the chiller, and wherein the standoff module includes a heat exchanger.

Clause 37: The energy storage system of any combination of Clauses 1-36, wherein the battery pack comprises one or more of nickel hydrogen batteries, lithium-ion batteries, magnesium-ion batteries, metal-air batteries, nickel-zinc batteries.

Clause 38: the energy storage system of any combination of Clauses 1-37, wherein it includes a cap module situated at an upper end of the stack.

Clause 39: A method of cooling a stacked battery energy storage system, comprising: sensing, with a temperature sensor, ambient temperature outside the stacked battery energy storage system; and controlling, via a controller, a cooling module and an opening and closing element based on the sensed ambient temperature, wherein the controlling includes: activating or deactivating the cooling module, opening or closing the opening and closing element to open or close a first flow path between the cooling module and one or more battery packs located in one or more of the plurality of stacked containers; and opening or closing the opening and closing element to open or close a second flow path between the one or more battery packs located in the one or more containers and an external environment.

Clause 39: The method of clause 38, wherein the cooling module is located in a standoff module between a support of a plurality of stacked containers of the stacked battery energy storage system and a bottom container of the plurality of stacked containers or the cooling module is located externally to plurality of stacked containers.

Clause 40: A method of assembling containers including a first container and a second container, wherein each of the plurality of containers includes a housing having an upper face and a lower face and wherein at least one of the first container or the second container includes a battery pack within the housing. The method includes stacking the containers so that the lower face of the second container is disposed on the upper face of the first container, the first container and the second container forming a stack. Each of the container have one or more flow interfaces and one or more electrical interface and the method includes connecting at least one electrical interface of the one or more electrical interfaces of the second container situated on the lower face of the second container to at least one electrical interface of the one or more electrical interfaces of the first container, situated on the upper face of the first container. The method also includes connecting at least one flow interface, of the one or more flow interfaces of the second container, situated on the lower face of the second container to at least one flow interfaces, of the one or more flow interfaces, situated on the upper face of the first container.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. An energy storage system connected to an electricity grid for releasing electrical energy to the electricity grid, the energy storage system comprising:
    a cooling module;
    a plurality of stacked international organization for standardization (ISO) shipping containers or modified ISO shipping containers, each ISO shipping container or modified ISO shipping container including a plurality of battery packs,
        wherein each of the plurality of stacked ISO shipping containers or modified ISO shipping containers is connected via a first flow path to the cooling module and a second flow path to an external environment outside the energy storage system, and
        wherein the cooling module is configured to cool the plurality of stacked ISO shipping containers or modified ISO shipping containers via the first flow path;
    an opening and closing element configured to open and close the second flow path;
    a temperature sensor configured to sense ambient temperature in the external environment; and
    a controller configured to control the cooling module and the opening and closing element based on the sensed ambient temperature.

2. The energy storage system of claim 1, wherein the controller is configured to:
    open the opening and closing element and deactivate the cooling module when the sensed ambient temperature is below a threshold temperature; and
    close the opening and closing element and activate the cooling module when the sensed ambient temperature is at or above the threshold temperature.

3. The energy storage system of claim 1, wherein the first flow path connects the cooling module and the plurality of stacked ISO shipping containers or modified ISO shipping containers in a closed loop, and wherein the second flow path connects the plurality of stacked ISO shipping containers or modified ISO shipping containers to the external environment via an inlet and an outlet.

4. The energy storage system of claim 1, wherein:
    an upper face of each respective ISO shipping container or modified ISO shipping container is in contact with a lower face of another ISO shipping container or modified ISO shipping container of the plurality of stacked ISO shipping containers or modified ISO shipping containers;
    an electrical interface situated on the lower face of each ISO shipping container or modified ISO shipping container is connected to an electrical interface situated on the upper face of another ISO shipping container or modified ISO shipping container of the plurality of stacked ISO shipping containers or modified ISO shipping containers; and
    a flow interface situated on the lower face of each respective ISO shipping container or modified ISO shipping container is connected to a flow interface situated on the upper face of another ISO shipping container or modified ISO shipping container of the plurality of stacked ISO shipping containers or modified ISO shipping containers.

5. The energy storage system of claim 4, further comprising a standoff module stacked with the plurality of stacked ISO shipping containers or modified ISO shipping containers, wherein:
    the standoff module is situated between a support and a bottom ISO shipping container or modified ISO shipping container of the plurality of stacked ISO shipping containers or modified ISO shipping containers; and
    the standoff module includes at least one fan and at least a first flow interface, situated on an upper face of the standoff module, connected to a flow interface situated on the lower face of the bottom ISO shipping container or modified ISO shipping container.

6. The energy storage system of claim 5, wherein the standoff module further includes:

at least a second flow interface connecting the standoff module to the cooling module so as to form part of the first flow path; and a third flow interface connecting the standoff module to ambient air in the external environment so as to form part of the second flow path.

7. The energy storage system of claim 6, further comprising a cap module stacked with the plurality of stacked ISO shipping containers or modified ISO shipping containers, wherein:

the cap module is on an uppermost ISO shipping container or modified ISO shipping container of the plurality of stacked ISO shipping containers or modified ISO shipping containers; and the cap module includes at least a first flow interface connected to a flow interface of the upper face of the uppermost ISO shipping container or modified ISO shipping container of the plurality of stacked ISO shipping containers or modified ISO shipping containers.

8. The energy storage system of claim 7, wherein the cap module further includes:

at least a second flow interface connecting the cap module to the cooling module so as to form part of the first flow path; and a third flow interface connecting the cap module to the ambient air so as to form part of the second flow path.

9. The energy storage system of claim 5, wherein the cooling module includes one of a chiller or a heating ventilation and air conditioning (HVAC) system.

10. The energy storage system of claim 9, wherein the cooling module includes the chiller, and wherein the standoff module includes a heat exchanger.

11. The energy storage system of claim 4, further comprising a standoff module stacked with the plurality of stacked ISO shipping containers or modified ISO shipping containers, wherein:

the standoff module is situated between a support and a bottom ISO shipping container or modified ISO shipping container of the plurality of stacked containers;

the standoff module includes at least a second flow interface that connects the standoff module to a circulation duct;

the circulation duct connects to the cooling module; and the cooling module is not stacked with the standoff module and the plurality of stacked ISO shipping containers or modified ISO shipping containers.

12. The energy storage system of claim 11, further comprising a cap module stacked with the plurality of stacked ISO shipping containers or modified ISO shipping containers, wherein:

the cap module is on an uppermost ISO shipping container or modified ISO shipping container of the plurality of stacked ISO shipping containers or modified ISO shipping containers;

the cap module includes at least a first flow interface connected to a flow interface of the upper face of the respective housing of the uppermost ISO shipping container or modified ISO shipping container of the plurality of stacked ISO shipping containers or modified ISO shipping containers; and the cap module also includes at least a second flow interface that connects the cap module to the circulation duct.

13. The energy storage system of claim 4, wherein each ISO shipping container or modified ISO shipping container, of the plurality of stacked ISO shipping containers or modified ISO shipping containers, is attached to adjacent ISO shipping containers or modified ISO shipping containers, of the plurality of stacked ISO shipping containers or modified ISO shipping containers, via twist locks.

* * * * *